United States Patent [19]

Junkins et al.

[11] Patent Number: 5,525,764
[45] Date of Patent: Jun. 11, 1996

[54] LASER SCANNING GRAPHIC INPUT SYSTEM

[76] Inventors: John L. Junkins, 1002 Shady Dr., College Station, Tex. 77840; Jagmohan S. Gadhok, 9467 Victoria La., Windsor, Calif. 95492; Andrew M. Browder, 1006 Milner Dr.; Vikram K. Kinra, 1106 Deacon, both of College Station, Tex. 77840

[21] Appl. No.: 257,730

[22] Filed: Jun. 9, 1994

[51] Int. Cl.⁶ .............................. G08C 21/00; G09G 3/02
[52] U.S. Cl. .............................. 178/18; 178/19; 345/156; 345/179; 345/180; 345/182
[58] Field of Search .......................... 178/18, 19; 348/15; 379/961, 100, 201–205; 345/179, 180, 182, 156, 112

[56] References Cited

U.S. PATENT DOCUMENTS

| | | | |
|---|---|---|---|
| 3,613,066 | 10/1971 | Cooreman | 178/18 |
| 3,706,850 | 12/1972 | Fisher | 178/18 |
| 3,838,212 | 9/1974 | Whetstone et al. | 179/18 |
| 4,012,588 | 3/1977 | Davis et al. | 178/18 |
| 4,125,743 | 11/1978 | O'Boyle | 178/18 |
| 4,294,543 | 10/1981 | Apple | 178/18 |
| 4,430,526 | 2/1984 | Brown | 345/179 |
| 4,553,842 | 11/1985 | Griffin | 178/18 |
| 4,558,313 | 12/1985 | Garwin | 178/18 |
| 4,568,182 | 2/1986 | Modjallal | 178/18 |
| 4,597,101 | 6/1986 | Kishimoto | 178/18 |
| 4,622,437 | 11/1986 | Bloom et al. | 178/18 |
| 4,642,422 | 2/1987 | Garwin et al. | 178/18 |
| 4,654,483 | 3/1987 | Imai | 348/15 |
| 4,688,933 | 8/1987 | Lapeyre | 178/19 |
| 4,732,440 | 3/1988 | Gadhok | 350/6.6 |
| 4,772,763 | 9/1988 | Garwin et al. | 178/18 |
| 4,777,329 | 10/1988 | Mallicoat | 178/18 |
| 4,814,552 | 3/1989 | Stefik et al. | 178/18 |
| 4,827,084 | 5/1989 | Yaniv et al. | 178/18 |
| 4,827,085 | 5/1989 | Yaniv et al. | 178/18 |
| 5,166,668 | 11/1992 | Aoyagi | 345/180 |
| 5,248,856 | 9/1993 | Mallicoat | 178/18 |

OTHER PUBLICATIONS

Junkins, "Least Square Approximation", *An Introduction to Optimal Estimation of Dynamical Systems*, Sijthoff–Noorhoff, Leyden, The Netherlands, 1978, pp. 1–44.

Eglowstein, "Almost as Good as Being There, New Technologies Improve Long–Distance Conferencing", Byte Magazine, Apr. 1994 (Microfield Graphics, Inc., Beaverton, OR).

*Primary Examiner*—Stephen Chin
*Assistant Examiner*—Vijay Shankar
*Attorney, Agent, or Firm*—Haugen and Nikolai

[57] ABSTRACT

A graphic input system for digitizing the location of an object moving on a planar surface and utilizing two or more primary laser light beams, the output beam of each scanning the planar surface through interposed controllably pivotally mounted beam deflecting scan mirrors. A stylus is moved over the planar surface in response to the position of the deflected position of the scanning beam. A signal generating beam detector positioned adjacent the planar surface delivers signals to a logical circuit to create the instantaneous value of a position voltage signal which is proportional to the tangent of the scan angle of each of the controllably deflected laser beams.

18 Claims, 19 Drawing Sheets

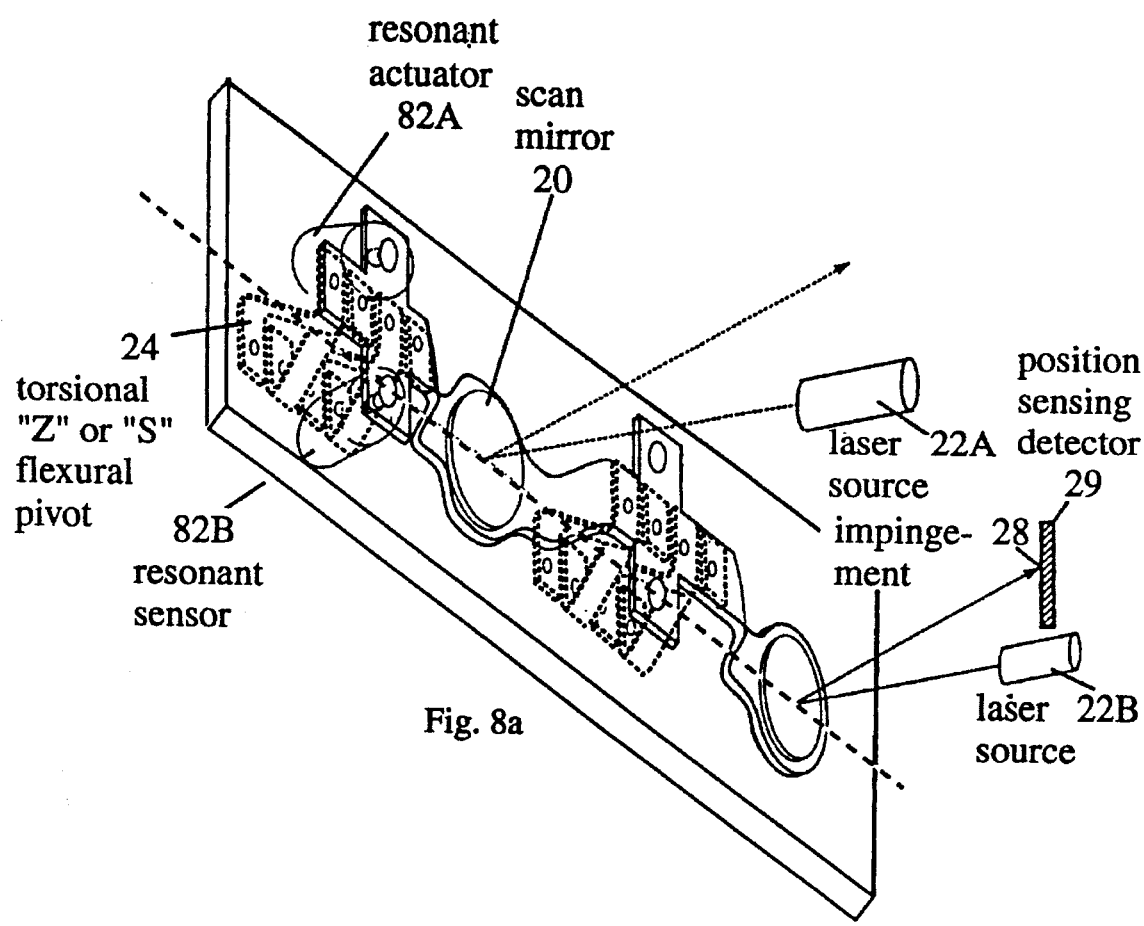
Fig. 8a
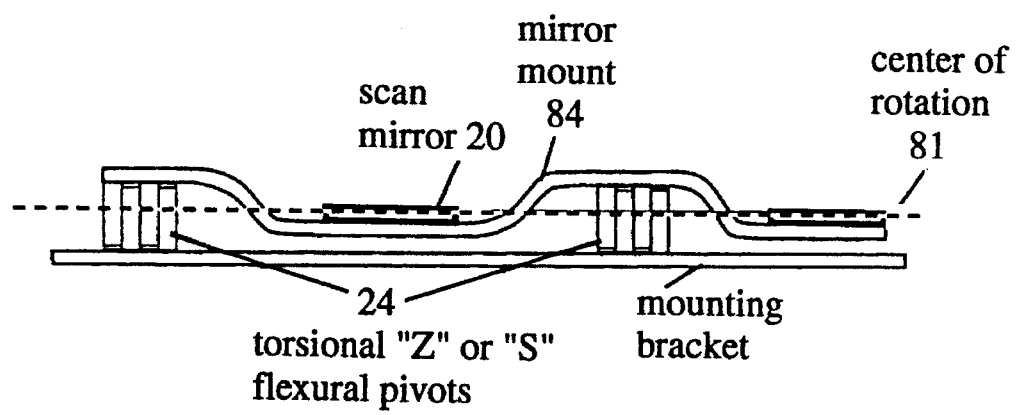
Fig. 8b
Fig. 8

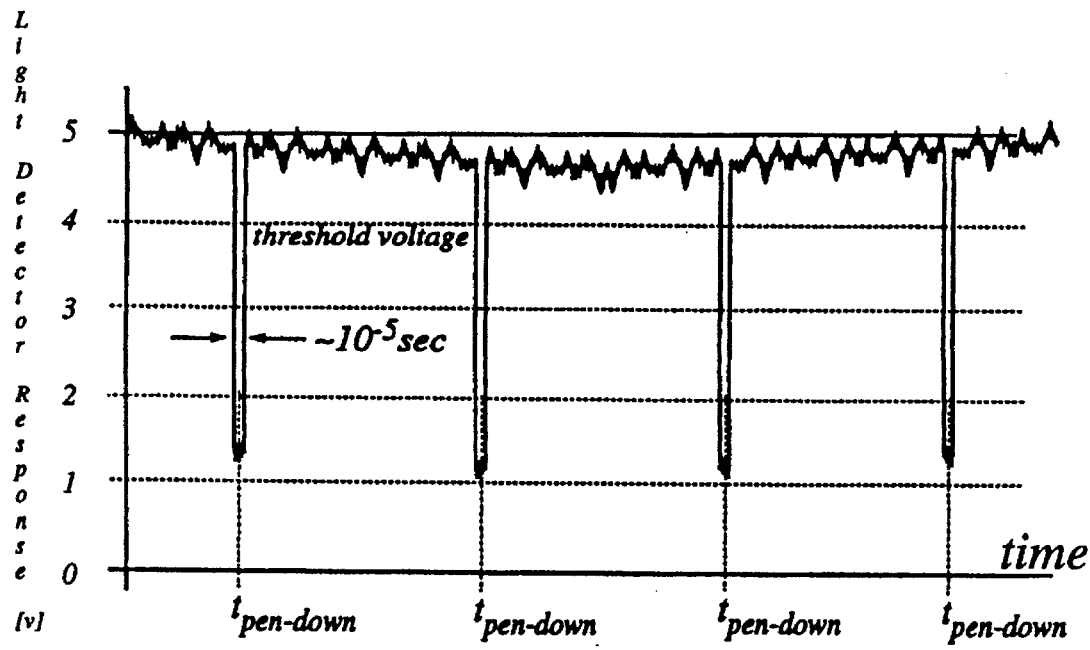
Fig. 9a
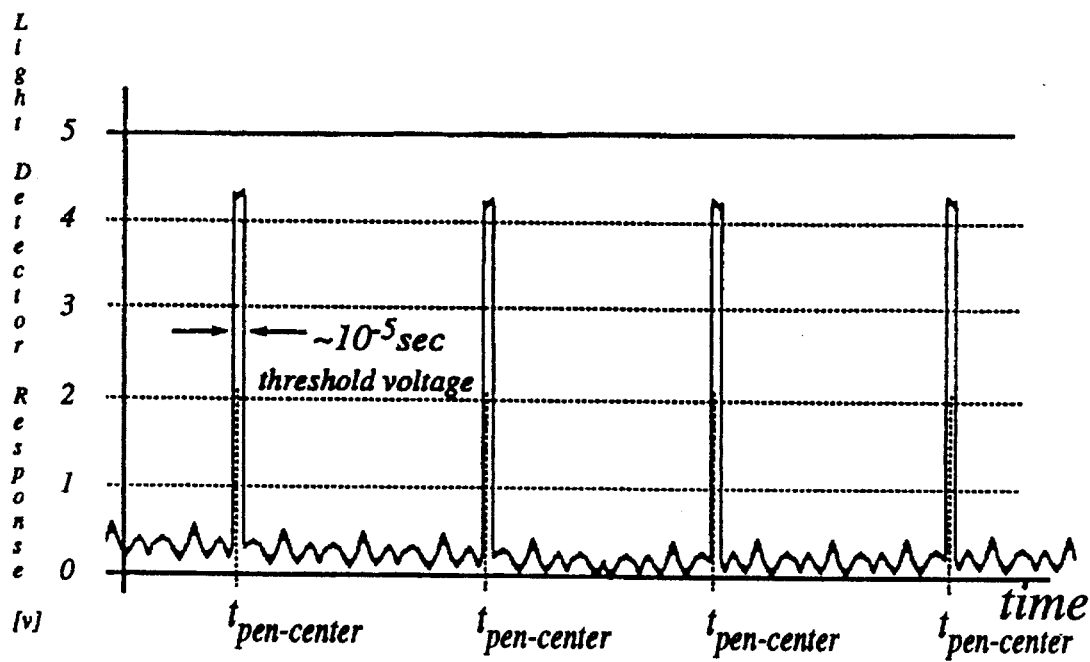
Fig. 9b
Fig. 9

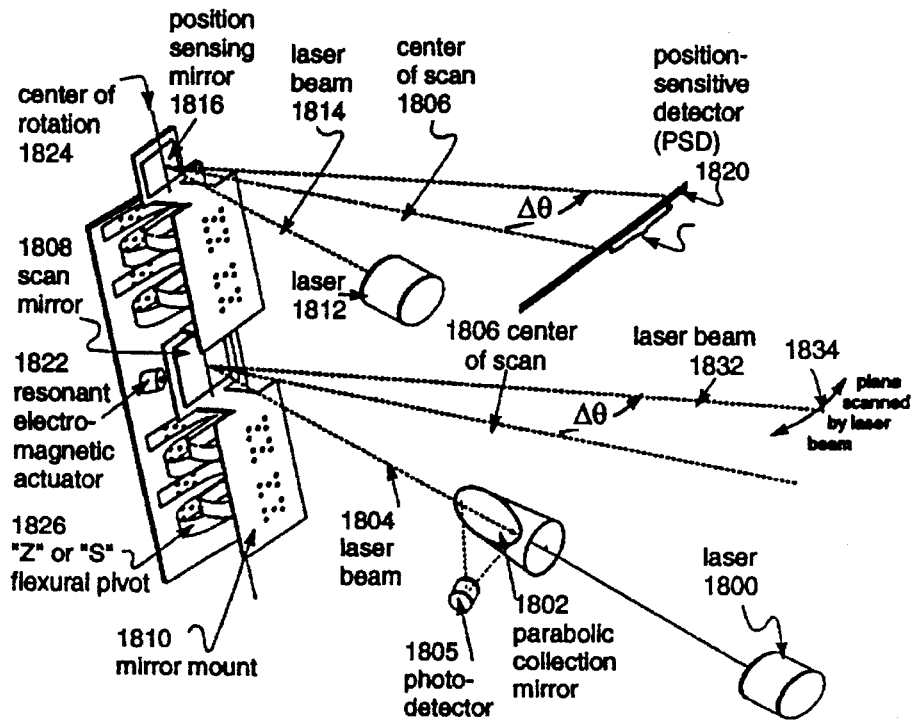
Fig. 18A
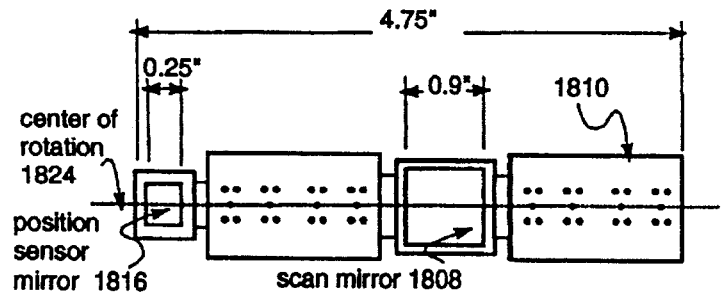
Fig. 18B-1
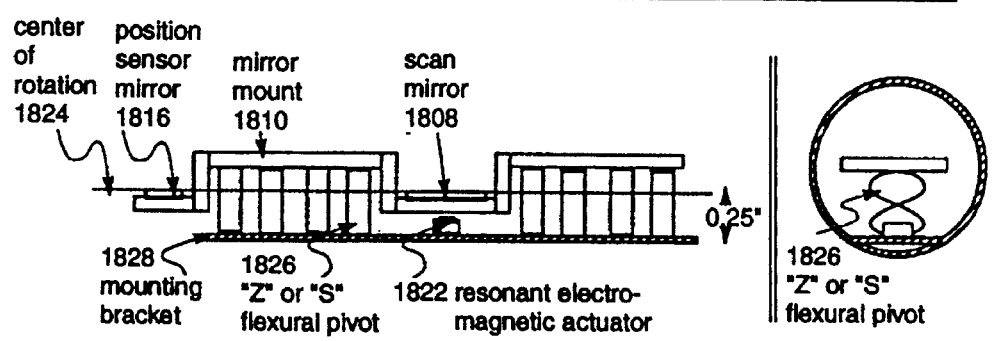
Fig. 18B-2
Figure 18B

LASER SCANNING GRAPHIC INPUT SYSTEM

FIELD OF THE INVENTION

This invention relates to graphic input systems broadly, and in particular, to a graphic input system that determines position coordinate data locating a moveable element or stylus, in which there is no physical connection between the moveable element and the remainder of the system, and in which both the stylus and the planar surface on which it moves are completely passive.

BACKGROUND OF THE INVENTION

Graphical data input systems have been used for about three decades, and various aspects of the prior art have been the subject of previous patents. There remains a need for a reliable and convenient graphical input system applicable to a large input space, and for which both the input device and the surface on which it moves are completely passive. This would enable, for example, murine real-time capture of a lecturer's writing and drawing on a wall-sized writing surface, with an inexpensive and reliable system.

In the prior art, there are many types of graphical input systems. The most common are "digitizing tablets" or "touch-sensitive screens" used for computer input devices. These make use of various pressure-sensitive or magnetic detection techniques to locate a stylus on an active screen or digitizing surface. Because the active surface areas for all known touch-sensitive surfaces are expensive to manufacture in large sizes (to the inventors knowledge, none are presently available for a "blackboard" sized input area, having height and width dimensions of several meters), the application of this class of approaches for digitizing on large surface areas is not attractive. The manufacturing cost of the touch-sensitive screens for digitization are proportional to some power of the size of the writing surface and therefore suffer from an inherent disadvantage when large input areas are needed. The most pertinent of the recent inventions in this area are those by Yantiv et al (U.S. Pat. Nos. 4,827,084 and 4,827,085). These patents also detail fax-like simultaneous telephone and hand written communications over touch tone telephones. Several other inventions relate to utilization of touch sensitive screen technology. Bloom (U.S. Pat. No. 4,622,437), in spite of the high cost of larger touch sensitive screens, relies upon this technology to digitize input on relatively large data planes.

A second branch of the prior art deal with triangulation using ultra-sonic acoustic waves. This set of approaches is appropriate for digitizing on larger surfaces, and there are several commercially available systems such as those manufactured by Science Accessories Corporation of Stratford, Conn. The acoustic methods have the advantage that they can be extended to digitize in three dimensions. However there remain limitations on accuracy and practical operation of these devices as discussed below. Three embodiments of acoustical triangulation have been described in the prior art: (1) a stylus with acoustic transmitter near the tip with a plurality of stationary receivers, (2) a plurality of stationary transmitters with the stylus being the receiver, and (3) a plurality of stationary transmitters and receivers with acoustical waves being reflected off the moveable element. The first two approaches depend upon using the known difference between the times of transmission and arrival of each burst of ultra-sonic acoustic waves, and an active stylus is needed; thus the stylus requires power and timing information and this has usually been transmitted from a computer via a cord. The third class of ultrasonic devices have a passive, sound-reflecting writing instrument, but this approach has not found many applications due to reliability and other limitations. For all of the acoustic approaches, the finite speed of sound in air (~1000 ft/sec) and the variability due to atmospheric changes present practical difficulties which limit the accuracy and digitization frequency of these devices.

This second branch of the prior art is well-described by the following U.S. patents: Whetstone (U.S. Pat. No. 3,838,212), which uses a moveable sparking stylus with stationary receivers. The high voltage spark requires a power cord, and is distracting due to the audible acoustic emission of the spark, and has limited applications due to electromagnetic interference and safety considerations. Davis et. al. (U.S. Pat. No. 4,012,588) employ a sparking stylus in their preferred embodiment, but also describe another embodiment in which the stylus is made cordless by using a stylus which reflects acoustic waves from stationary transmitters to stationary receivers. Others (e.g., Mallicoat, U.S. Pat. No. 4,777,329, Stefik et. al. 4,814,552) employ a cordless stylus where timing data is communicated via electromagnetic waves from a computer to the stylus. Due to the relatively low speed of sound in air, and also due to the directionality of acoustic transmitters and receivers, the acoustic approach encounters limitations on accuracy, frequency of measurements, and reliability. As a consequence, none of the commercially available systems have maximum sample rates of more than 100 (x, y) pairs/second and operate reliably up to sample frequencies of about 50 (x, y) pairs/second, while spatial sensitivity of 0.01 inch can be obtained with careful calibration, accuracy over large surface areas cannot be guaranteed without frequent re-calibration due to atmospheric density variations, and the greater the distance from the emitter to the receivers, the more likely that one or more of the receivers win not hear the signal due to attenuation and directionality of the transmitters and receivers. The use of an active stylus on a power cord, with the corresponding cost, safety, and ease of use implications, is unattractive for many applications.

A third approach exists in the prior art which makes use of optical sensors and laser scanners to locate the stylus. The concept introduced in 1971 by Cooreman (U.S. Pat. No. 3,613,066) is the key historical invention in this area. This patent introduced the idea of using two laser beams to scan a plane and reflect off a stylus to determine two angles and therefrom, the position of the stylus. Cooreman's preferred embodiment used a single laser with a beam splitter to generate the two scanning laser beams where scans were caused by moveable mirrors. Angle encoders were used to measure each mirror's motion and thereby determine the laser beam scan angles. Manufacturing of data input devices based upon Cooreman's invention was not pursued, until the 1980s, most likely due to several un-resolved problems in Cooreman's invention: (i) no provision was made for an accurate pen-up and pen-down detection, and (ii) no practical method was established for generating sufficiently accurate and stable alignment and mirror motion measurements required to implement the preferred embodiment presented by Cooreman.

In U.S. Pat. Nos. 4,642,422 and 4,772,763, Levine and Garwin present enhancements of Cooreman's invention; they introduce a method for calibration and processing of the measured scan angles to determine the digitized coordinates. Their enhancements include a modification of Cooreman's invention whereby a single laser and scanner can be used to determine the stylus position. This embodiment uses reflections off two dihedral mirrored surfaces and two retro-reflecting boundaries. As a consequence of the two dihedral mirrors, the scanned laser beam is reflected such that it encounters the stylus twice per laser beam scan. The stylus coordinates can be determined by finding the scan angles at which the stylus is encountered using means described by Levine and Garwin. Their invention made Cooreman's concept practical, and was especially designed for the case for which the data surface is a computer screen. While U.S. Pat. Nos. 4,642,422 and 4,772,763 represent useful enhancements of Cooreman's invention (U.S. Pat. No. 3,613,066), their embodiment has two key disadvantages as compared to the invention described in this patent: (i) Their sensing and data processing concepts require the real-time computation of the tangents of the scan angles to determine the digitized coordinates, and (ii) their invention requires two precisely manufactured and mounted dihedral mirrors along the border of the data surface. The first disadvantage (i), for a given processor, imposes a computational limit upon the maximum scan frequency. Both the first and second disadvantages affect the cost of the practical implementation of Levine and Garwin's invention. The present invention introduces novel concepts which eliminates these two disadvantages.

In 1987, Lapeyre (U.S. Pat. No, 4,688,933) explored an approach to digitization using two photodetectors arranged such that the detectors can sense light emitted from a light emitting stylus tip. Lapeyre's invention provides a scanner-free detector, but the resulting signal is an angular measurement which requires a corresponding high precision method to make these angular measurements and thereby achieve the desired digitization accuracy. For this reason, Lapeyre's invention is not applicable to high precision digitization over large areas.

There is another well-known means in the prior art for recording and digitizing hand-written information, namely through the use of video cameras to acquire a movie of the hand-writing, and digital image processing to subsequently digitize the desired hand-drawn information visible in the videotape. This means, however, with a single fixed camera, cannot inexpensively acquire high precision digitization of (x, y) needed over large surface areas with existing technology. It is possible, of course, to extract sufficiently accurate information using extensive digital image data processing and video recording(s) made from a moveable camera(s).

In a more recent invention by Gadhok (U.S. Pat. No. 4,732,440), significant advances have been made in resonant laser scanners which make use of ultra-stable flexural pivots with an embedded optical sensor to determine the position of the scanning mirror. Gadhok's invention makes stable resonant scanning feasible with wobbles of less than 10 microradians at scan frequencies ranging from 50 to 5000 Hertz. The present invention combines key features of Cooreman's original laser scanning invention (U.S. Pat. No. 3,613,066) with Gadhok's (U.S. Pat. No. 4,732,440 ), and several novel enhancements. In essence, this invention realizes and extends Cooreman's 1971 objectives by enhanced means. The enhancements enable high-precision, high-frequency digitization over very large input surfaces.

SUMMARY OF THE INVENTION

This invention is for a graphic input system applicable to digitizing the location of an object moving in a general fashion on a large planar surface, effected by using two or more scanning mirrors, arranged such that each scan mirror causes a beam of electromagnetic energy to sweep just above the entire planar surface. This invention introduces enhancements and extensions of Cooreman's 1971 invention (U.S. Pat. No. 3,613,066), with novel means for laser scanning, a new method for extracting the digitized stylus coordinates, and novel hardware/software for enabling a new capability, interactive note-taking.

The invention involves two or more laser beams scanning just above a planar surface on which a stylus or pen moves. The location of a stylus is found by detecting the interruption (by the stylus tip) of each of these scanning beams. Each laser beam is caused to scan in a stable fashion by resonant electromagnetic excitation of scan mirrors mounted on flexural pivots, as described by Gadhok (U.S. Pat. No. 4,732,440). A means for detecting the impingement of each laser beam on the stylus triggers a novel mirror position measurement method; at the instant of beam impingement on the stylus, each mirror position measurement device generates a voltage signal proportional to the tangent of the scan angle theta of each laser beam. The harmonically forced resonant flexural pivots, employed to support the oscillating scan mirrors, cause the plurality of laser beams to sweep the plane in a stable and repeatable fashion. A unique signal processing method is developed which results in the conversion from the analog measurements of two (or more) mirror scan angle tangents into the (x, y) position data without requiring any trigonometric function evaluations, thereby greatly simplifying the design, resulting in very modest computation requirements, and permitting extremely high scan frequencies.

Moreover, this invention is for a novel laser scanning means to accurately, reliably, and efficiently locate a passive stylus moving on or very near a passive planar surface. The moveable element may take the form of a writing element, an eraser, a pointer, or some point on a moving object such as a robotic positioning system. In the preferred embodiment, two scan planes are present in which a plurality of laser beams scan in each of the scan planes. The first laser beam scan plane is very close to the data surface and the invention embodies a means for detecting the instant that the stylus interrupts the laser beam, serving to establish a pen-down signal. Around the perimeter of the data surface is a light-reflecting bevel which nominally protrudes above the plane of the data surface a small but sufficient distance to penetrate the first plane of laser scanning, but not so far as to penetrate the second laser scan plane. Thus the laser beams in the first scan plane nominally reflects off the light-reflecting perimeter, but are interrupted when the stylus penetrates the first scan plane. The second scan plane is sufficiently displaced from the data surface that the beams impinge and reflect off a light-reflective collar on the stylus; the impingement and detected retro-reflection of two or more laser beams in the second scan plane provide sufficient information to triangulate accurately to determine the stylus position. A further novel feature is that the scan mirror position sensors are used to directly measure the tangents of the scan mirror angular deflection; associated self-calibration and data processing concepts are introduced such that the entire set of computations leading to the stylus coordinates can be accomplished without the necessity of computing any trigonometric functions, enabling efficient practical implementations based upon this invention. Finally, we describe a novel automated note-taking embodiment in which the laser scanning-derived digitized information is transmitted by wireless means to a plurality of portable client computers which have independent means for graphical input, annotation, software manipulation, and storage/replay of the information so digitized.

BRIEF DESCRIPTION OF THE DRAWINGS

FIGS. 6–25 show various aspects of the preferred embodiment which are discussed in detail in the text.

FIG. 6 shows both the pen-down detecting beam (FIG. 5) and the collar reflection beam (FIG. 4) being scanned by the same mirror, for one of a plurality of scanners.

FIG. 7 shows a top view (normal to the writing surface) of the details of the light path, optical elements, and detectors, and angular geometry for the reflected light. For clarity, the lasers, detectors, and the collection mirror are offset in this figure. This geometry applies to either reflection off the stylus collar (FIGS. 4, 6) or the light-reflecting border (FIGS. 5, 6).

FIG. 8 shows the mechanical arrangement of the scan mirror (one of two or more). FIG. 8a shows a three-dimensional view of the curved bracket (84) on which the scan mirror (20) is mounted. The bracket (84) is mounted to two sets of flexural "S" or "Z" torsional pivots (24), which are in turn mounted to the inertially fixed base plate (80). The pair of electromagnetic actuators (82) impose a harmonic torque, of judicious amplitude and frequency, on the bracket (84) so that it oscillates at its resonant angular frequency (~80 Hertz, for the preferred embodiment) generating a scan angle of prescribed amplitude (±45°, for the preferred embodiment). The center of rotation (81) of this resonant oscillation is ideally tangent to the centerline of the surface of the oscillating scan mirror (20), and the co-planar Position Sensitive Detector (PSD) mirror (25).

FIG. 9 shows a graph of typical voltage signals (versus time) from the light detectors which detect interruptions and reflections of the laser beams (FIGS. 2–7). FIG. 9a shows the signal from the detector (39) sensing the reflected light from the light-reflecting perimeter around the data surface (FIGS. 3, 5, and 6). Notice when the pen is down, a sharp voltage decrement occurs during each time interval while the pen tip is impinged by the scanning laser beam, because the stylus tip blocks the return of the reflected laser beam from the light-reflecting bevel [(36), FIG. 5]. FIG. 9b shows the signal from the detector sensing the reflected light from the stylus light-reflecting collar [(50), FIGS. 4, 6, 7]. Notice the sharp voltage increase during the short time interval that the scanning laser beam is being reflected off the collar (50). Each of two or more detectors for each laser scanner generates similar outputs at the instant during the scanner's impingement on the light reflecting stylus collar; at these times, the scan mirror position sensor (FIG. 2) output (FIG. 10) is sampled and Eqs. (3) and (6) are used to compute the center of the stylus and the stylus tip coordinates.

FIG. 10 shows a graph of typical voltage signals (versus the angle off center of scan) from the angle position detector (FIG. 2) used to determine the angular position of one (of two or more) laser scanning mirrors [(20), FIG. 2 and (33), FIG. 7].

FIG. 11 shows the major functional subsystems of the host processor which acquires the laser scanning measurements, determines the coordinates of each point and transmits these to the client devices.

FIG. 12 shows a more detailed view of the host processor subsystems and the calculations required to compute the digitized coordinates (x, y). Also shown is the encoder and radio modem transmitter for sending these coordinates by wireless means to a plurality of receivers for input to client computers.

FIG. 13 shows the preferred embodiment concept of an automatic note-taking system, consisting of the laser scanning system to digitize the hand-written information on a large input surface, transmit it to a plurality of client machines by wireless means, and the further individual, real-time annotation and manipulation of this information by the clients.

FIG. 14 shows the functional subsystems of a typical client processor, consisting of the radio modem for receiving the (x, y) digitized coordinates from the host, a pen computer with a video display having a touch sensitive digitizing screen to permit the client to hand-write additional annotations and manipulate the data received.

FIG. 15 shows a client computer with a touch sensitive screen and graphical input device (a "pen-PC notebook computer").

FIG. 16 shows a typical view of lecture material appearing on a client computer screen. Notice the sliders (1608*j* and 1608*k*) permit the visible portion (on the current screen of a client computer) of the master data board (10 of FIG. 13), to be client controlled, note that the magnification (1608*o*) of the displayed information is client controlled (using the pen to touch the zoom icons 1608*c,d*), and a number of other features of the client processor software for client editing and interactive manipulation of the information. All user interaction is accomplished through inputs made using a hand-held pen (1504).

FIG. 17 illustrates the file structure of the client software, new files may be saved in a multi-level directory fashion, and old files or portions thereof can be edited or copied into the current window. Many other on-line, real-time draw, editing, and other pen-input software can be invoked to import or export new information to/from the current window using only pen input.

FIG. 18A shows an exploded sketch of one (of two or more) of the scanners, illustrating the principal laser for scanning the writing surface and the position sensing detector (PSD). FIG. 18B shows top and side views of the laser scanner bracket, flexural pivots, scan and PSD mirrors, all dimensionally consistent with the preferred embodiment.

FIG. 20 is an engineering drawing of the preferred embodiment of the laser scanner (one of two or more identical scanners).

FIG. 21 is a sketch of the left scan head for the two scanner version of the preferred embodiment, showing the laser scanner, PSD, and three point mounting bracket.

FIG. 22 shows the left and right scanners (mirror symmetry) for the two scanner version of the preferred embodiment.

FIG. 23 shows the two scanner version of the preferred embodiment with the left and right scanners mounted above a planar writing or drawing surface.

FIG. 24 is a sketch of the trigger logical circuit for the reflected light detector which acts as a data acquisition trigger to sample the PSD voltage.

FIG. 25 is a sketch of the Position Sensing Detector signal conditioning circuit showing the currents from the PSD being converted to voltages and the ratio of their difference and sum being formed, amplified and shifted to yield a voltage which is proportional to the tangent of the scan angle.

DETAILED DESCRIPTION OF THE PREFERRED EMBODIMENT

Preliminary Remarks

Motivated by the above considerations of the prior art, the present invention enhances U.S. Pat. Nos. 3,613,066 (Cooreman) and 4,732,440 (Gadhok), by modifying them to accommodate each other and incorporate enhanced means for laser scanning, scan mirror position determination, pen-up/pen-down detection, and signal processing to compute (x,y). The new graphic input invention described herein employs unique resonant laser scanning concepts which enable the following advances:

(i) enables graphic input on both small and large planar data surface (20 square meters and larger) to be routinely accomplished, (ii) enables use to a completely passive stylus and data surface, (iii) enables accurate and reliable pen-up and pen-down detection, (iv) enables significant increases in both the digitization frequencies and the spatial accuracy of digitization, as compared to ultra-sonic digitization methods.

(v) enables the development of a new capability: automated and interactive note-taking in a classroom setting.

In addition to these advances, the invention described herein involves several novel features which enable all of the above advances to be accomplished with high efficiency regarding manufacturing cost and computer requirements. In particular, the triangulation process to determine the (x, y) coordinates from the unique design of this invention can be accomplished by simple algebraic formulas which contain no trigonometric functions. Thus, very high digitization rates can be achieved with modest computer requirements, this is an important feature enabling inexpensive manufacturing of systems based upon this invention.

Geometric Aspects of the Preferred Embodiment

Figure 1:
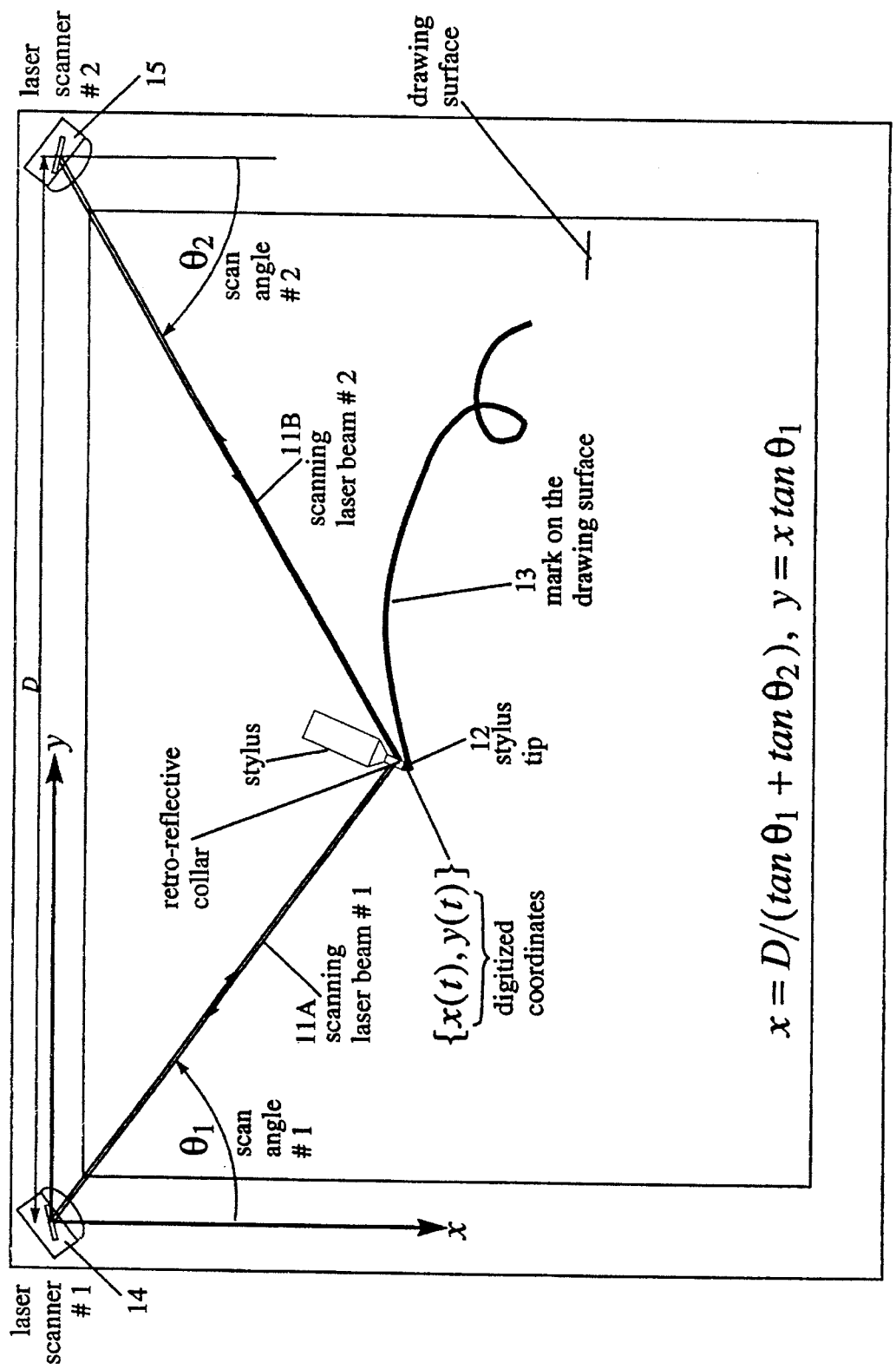
FIG. 1 shows a laser scanning concept to digitize hand written information. Note the scan angles theta 1 and theta 2, along with geometry-derived formulas to compute the desired rectangular coordinates (x, y) locating the instantaneous stylus (or other moveable element) tip.

With reference to FIG. 1, we consider the situation in which a passive stylus is moving in contact with a writing surface (10). The two laser beams (11A and 11B) are scanning just above the surface (1) and are shown impinging on the tip (12) of a stylus (30). The impingement will not generally be simultaneous, however, the scan frequency will be sufficiently fast that the pen will have moved negligibly between the two laser beam impingements. The stylus (30) could be a hand held pen or marker, as in the case of a teacher giving a lecture.

The situation depicted in FIG. 1 could also be a manufacturing process in which some mechanical or robotic device is moving in some general way over a planar workspace. It is desired to determine (x, y) coordinates closely spaced along the path (13) of the stylus (30) point (12), and it's contact (or lack thereof) with the data surface (10) by passive optical means. In some applications, it is anticipated that more than two scanning laser beams may be advantageous.

Figure 3:
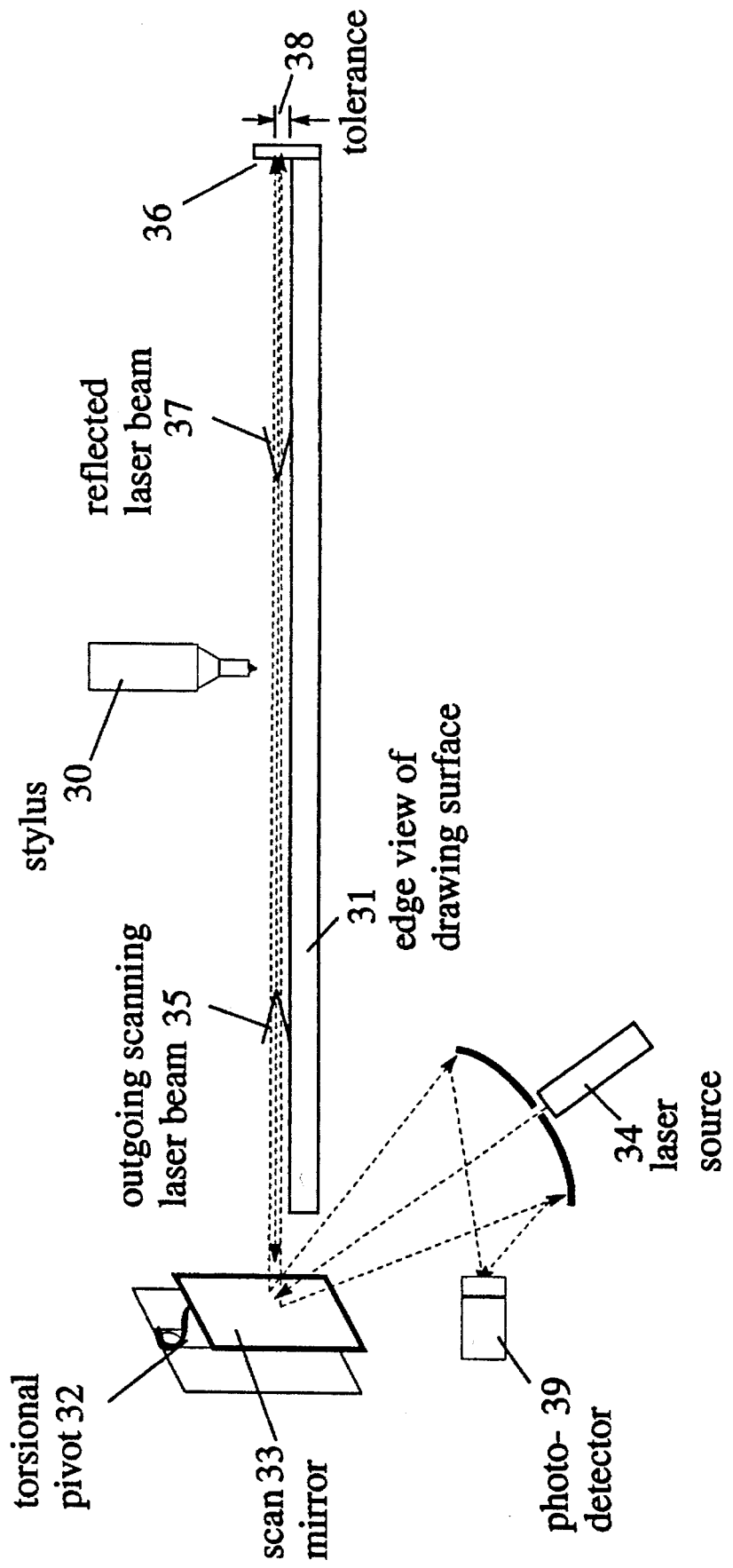
FIG. 3 shows an edge view of the writing surface wherein the light path a laser beam is scanned near the writing surface to detect the location of the stylus tip; if the stylus does not interrupt the beam, it reflects off the light-reflecting border, the interruption of this beam (pen-down) results in the decrement of the light-detector signal (FIG. 9). The time of the pen-up and pen-down events can be accurately determined by simple signal threshold tests; the mirror position detector can be sampled precisely (at the instants that the scanning laser beam encounters the stylus tip) to determine the corresponding mirror position. This scheme can be used as the sole means for triangulation, or can be used as the pen-up/pen-down event detector with other means used (FIGS. 4–6) to detect with greater precision the stylus location.
Figure 5:
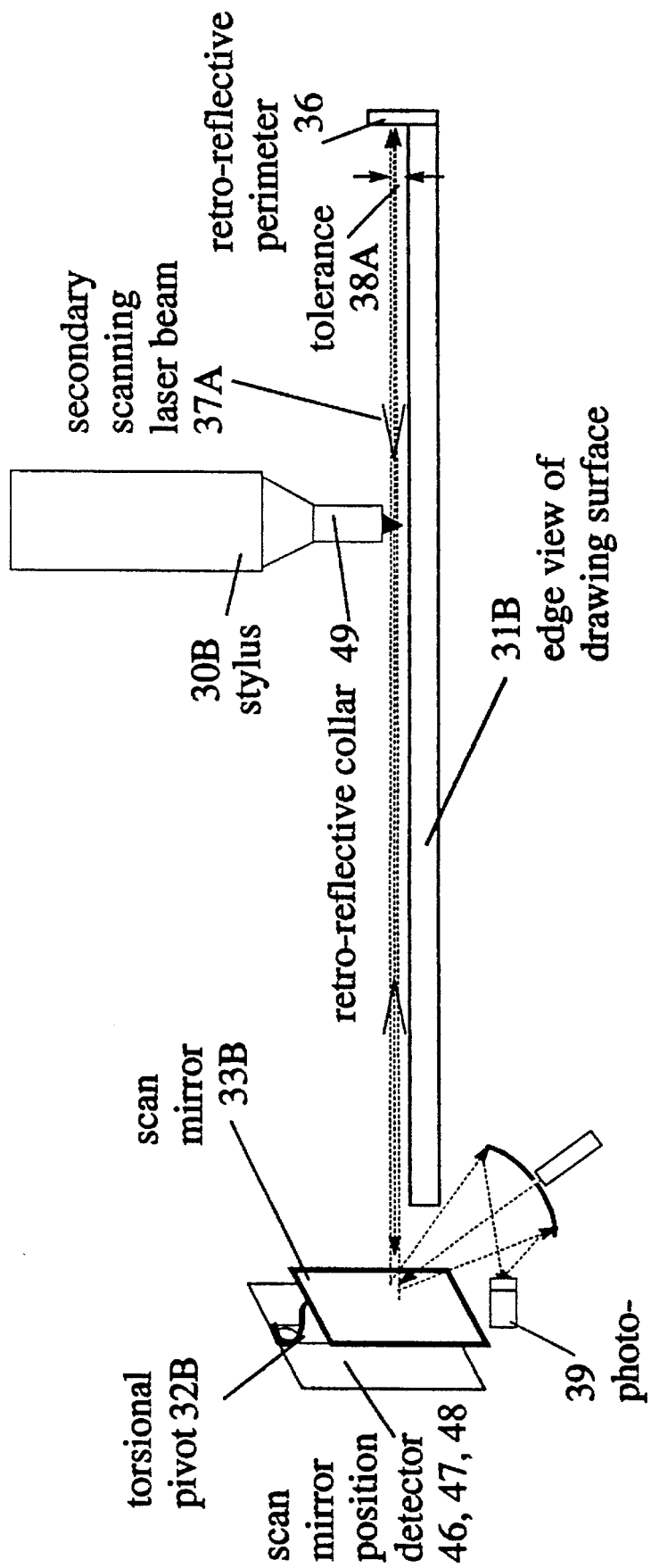
FIG. 5 shows the case of a retro-reflecting beam being scanned near to a planar surface to establish a sensitive pen-up/pen-down event detector. This beam will be scanned in a plane displaced by a small distance (say, less than 0.02 in.) from the writing surface. If the pen is down as shown, during encounter with the tip, the scanning laser beam will be blocked so that it cannot impinge off the light reflective border (36). Thus there is an absence of a reflection which results in a sharp voltage decrement by the detector and thus the pen-down event can be detected.
Figure 6:
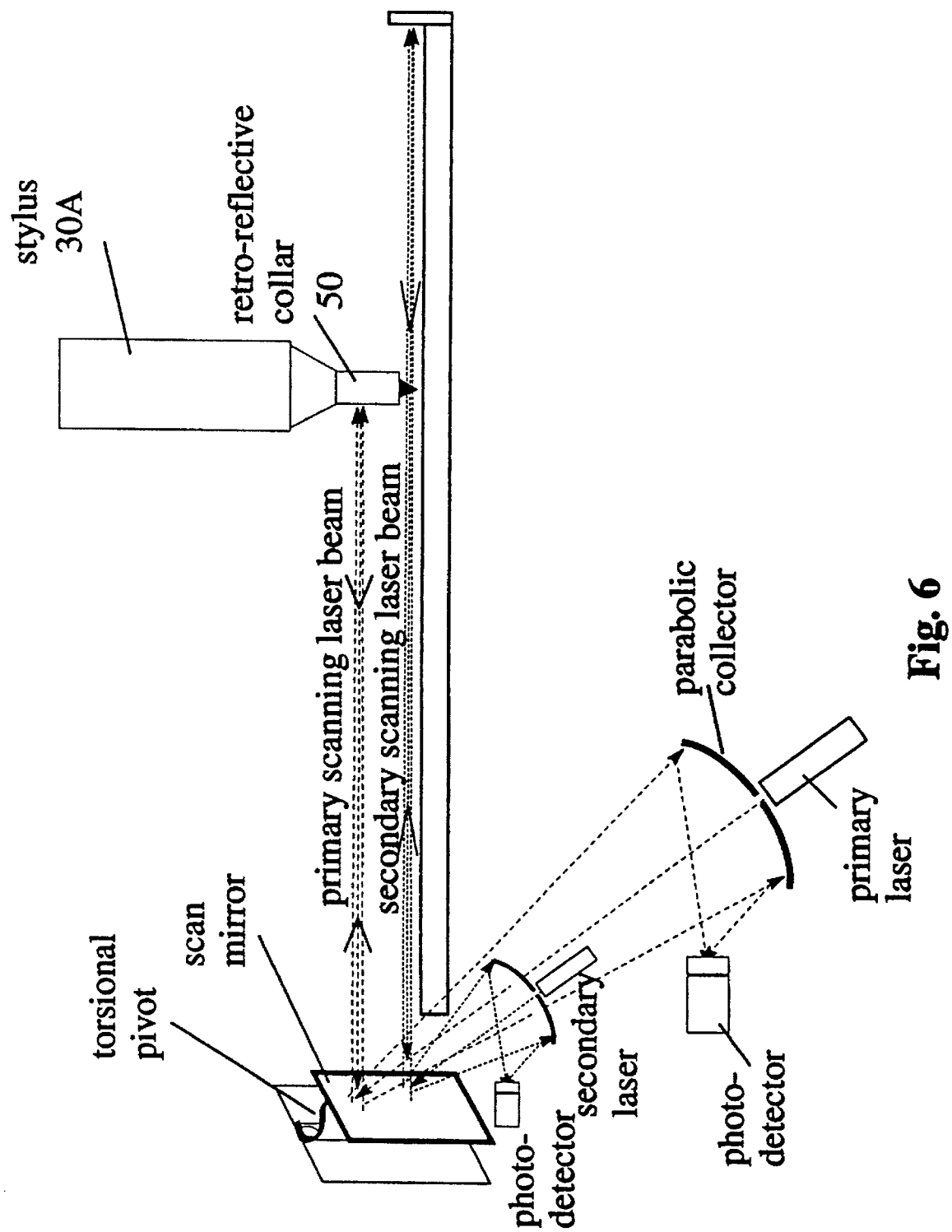

Two passive optical detection means for locating the stylus tip are described:

I. With reference to FIGS. 3, 5, and 6, a laser beam interruption detection method by which the pen tip interferes with one or more laser beams scanned in a plane displaced a sufficiently small distance (38) [for example, 0.02±0.02 in.], from the planar data surface, in conjunction with a retro-reflecting perimeter (36) around the border of said data surface.

Figure 4:
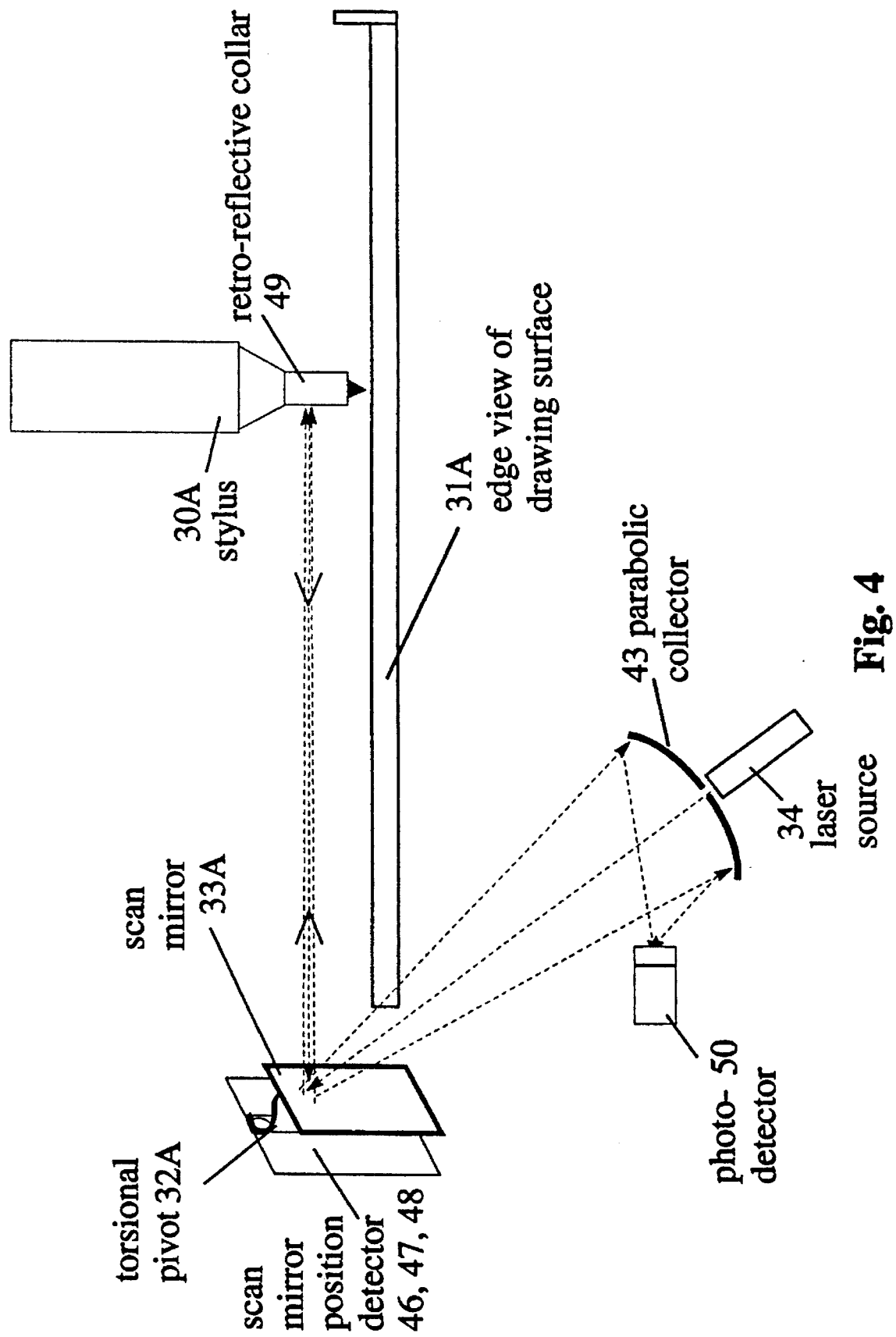
FIG. 4 shows an edge view of the writing surface with the laser beam from one of a plurality of scanners impinging off a retro-reflecting collar near the stylus tip and thereby providing a second means of detecting the stylus position and triangulating to determine the stylus position. Due to the quality of the retro-reflection using available reflective material, more consistent and accurate position determinations can be made by finding the centroid of successive beam impingements off the perimeter of the light-reflecting collar.

II. With reference to FIGS. 4 and 6, a laser beam reflection/triangulation method whereby two or more laser beams scan a second plane parallel to the data surface but sufficiently displaced from it and the first scan plane (for example, 0.5±0.2 in.) so that the laser beams in this second scan plane will reflect off a cylindrical retro-reflective collar on the stylus when the stylus is near the data surface (FIG. 4, 31 A).

Referring to FIGS. 4 and 6, the retro-reflecting surfaces on the pen collar (49) and around the perimeter could be chosen from a variety of materials, such as the commercially available retro-reflecting tape known as Scotchlite™ (3M-7610) made by 3M Corporation of Saint Paul, Minn. This reflective tape is known to be highly reflective with near-uniform return light for incident beams up to 45° away from the tape surface normal; this is judged to be compatible with hand-held markers, since incidence angles would seldom exceed 30°.

The tolerances indicated above reflect easily achievable alignments which are adequate for many applications such as digitizing hand-written and hand-drawn information of a lecture, they are not to be construed to imply limitations of this approach. The stylus contact can be determined by means (I), or by a combination of means (I) and (II). The stylus position can be determined by using either means (I), means (II), or a combination of the two means. In the preferred embodiment, the stylus contact is determined by means (I) whereas the stylus position is determined by means (II). For both means, return light is detected by optical and electronic sensors, and the scan mirrors motions are determined by electro-optical position detectors as described below. For most reliable operation, the pen-down event and stylus position should be independently confirmed by both means, this will prevent the occasional spurious pen-down indications which would cause, for example, incorrectly drawing lines connecting gaps between hand drawn block characters when the pen is slightly lifted off the data surface, or incorrectly draw lines if some other object (other than the writing stylus) interrupts one or more of the beams.

Considering further details of the pen-down detector, refer to FIGS. 3 and 5. This is an edge view of the plane being scanned by the laser beam (35). Notice that the beam (35) from the laser (34) passes through a hole in a parabolic collection mirror and is deflected off the oscillating scan mirror (33). The scan mirror is driven at it's resonant natural frequency, determined by its mass properties and the stiffness of the torsional flexural pivot (32), so that the plane just above the data surface is swept by the laser beam (35) in a stable and repeatable fashion. Unless the stylus tip (12) is sufficiently near to the data surface (31), the laser beam (35) reflects off the retro-reflecting bevel (36) and the light returns (diverging slightly), reflecting off the scan mirror (33) and the parabolic mirror focuses it onto a detector (39), indicating that the stylus tip is down.

Now consider the analogous discussion for a beam (scanning in the second scan plane) which reflects off a light reflecting collar on the stylus. In FIG. 4, the laser (41) sends a beam through a hole (42) in a collection mirror (43); this beam is reflected by the oscillating scan mirror (33A) which causes the beam to sweep above the plane (31A) a small but sufficient distance from the surface (31A) so that it will impinge off the light-reflecting collar (49) if the stylus (30) has it's point (12) in contact with the writing surface. If the stylus is present, the light will be reflected off the collar (49), otherwise no reflection will occur. The reflected light from the collar (49) returns to the scan mirror (33A) and is focused by the parabolic mirror (43) onto the detector. Thus the presence of a significant signal (i.e., greater than a threshold tolerance) output from the detector (50) indicates a reflection off the collar (49). The time interval for which this signal exceeds the threshold can be centroided to estimate accurately the instant that the laser beam passed over the center of the retro-reflective collar (49).

Figure 2:
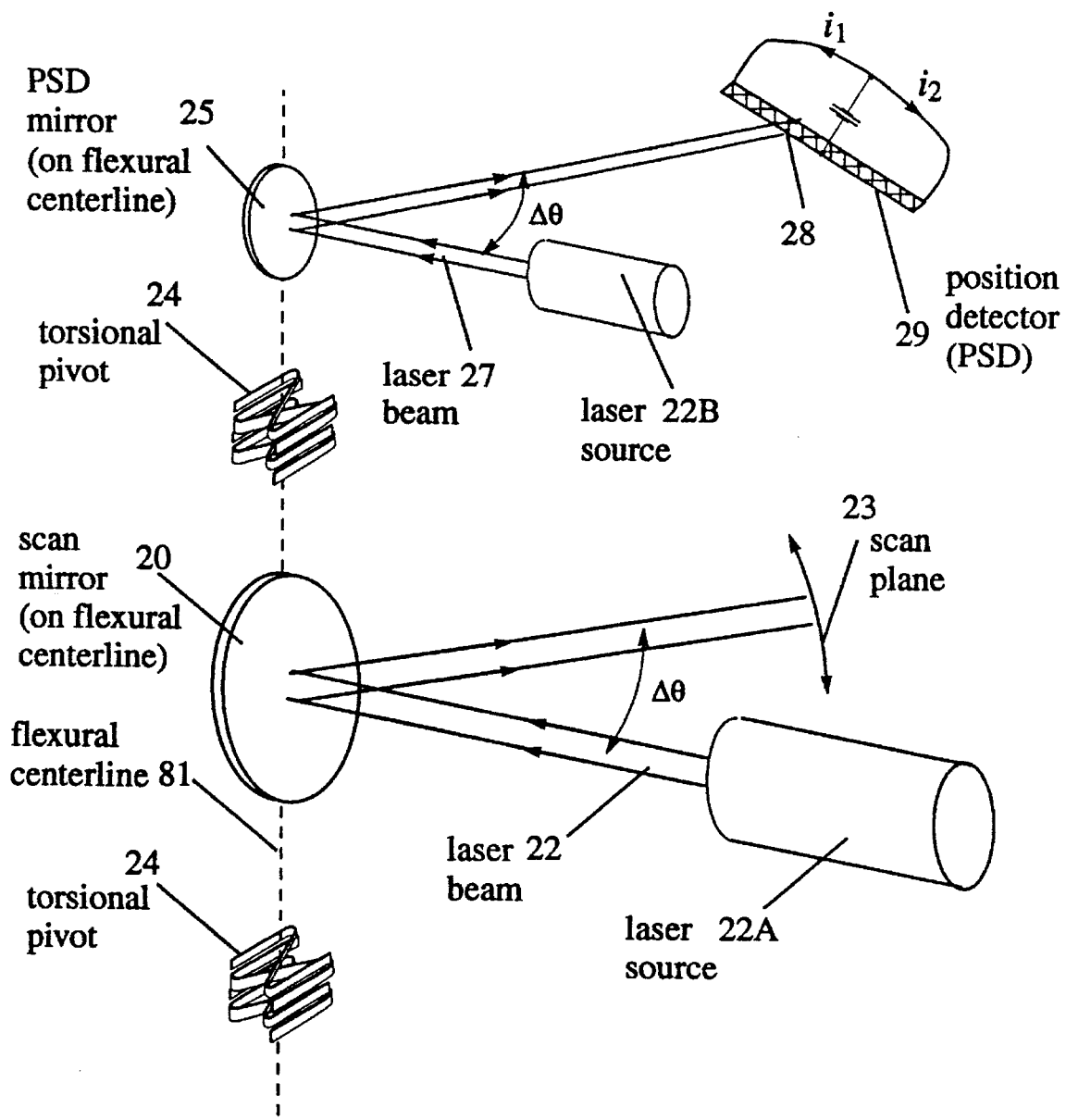
FIG. 2 shows an oscillating scan mirror which directs the beam of a laser to scan over a planar surface and the mirror angular position detecting device which utilizes a second laser beam which is reflected off a second mirror (25), which is co-planar with the scan mirror, onto a light-sensitive linear detector. [See FIG. 8 for mechanical/mounting geometry details.] The response of the linear detector is ideally proportional to the tangent of the scan angle as measured from the center of scan. Due to non-ideal effects, a departure from perfect linearity may be expected in practice. The precise, weakly nonlinear relationship between the tangent of the scan angle and the actual sensor output can be established by calibration, and the system can be made self-calibrating as discussed in the preferred embodiment.

Now observe the exploded drawing of FIG. 2. This shows the unique arrangement of the resonantly oscillating scan mirror (20) and the mirror position sensor. The optical components in FIG. 2 are offset for clarity, because in the true geometric configuration, the components overlay each other and it is difficult to see the light paths. The mechanical layout of the resonant flexural pivots and the scan mirror are indicated in FIG. 8. The remaining electro-optical components are not shown in FIG. 8, for clarity of the mechanical configuration. The primary laser (22) sends a laser beam (21) which reflects off the scan mirror (20) in such a fashion that it is swept (23) over a planar surface (just above the data surface). The pair of flexural pivots (24) are mounted rigidly to the mirror (20) in such a fashion that the scan mirror surface (20) ideally oscillates in angular rotation only about its geometric center, which lies on the center of rotation of the flexural pivots (i.e., the mirror has negligible translation). The scan mirror is driven at its natural frequency using a sinusoidal electromagnetic torque, as a consequence, the scan mirror ideally executes resonant simple harmonic angular motion, and in the prior art, Laser Scanning Products, Inc., has been successful in manufacturing highly stable and reliable resonant scanners since the early 1980s. The use of a stably oscillating scan mirror is integrated in this invention with an optical sensing method for measuring the mirror position. A second laser (22B) directs a laser beam (27) off a second mirror (25) which is co-planar with the oscillating scan mirror in such a fashion that the reflected beam (27) impinges (28) on a light-sensitive linear detector (29). The detector (29) outputs a voltage v proportional to the current imbalance, $v=\alpha(i_1-i_2)/(i_1+i_2)$, and the current imbalance is a linear function of the distance (70) along the light sensitive linear detector (29) to the impingement (28) of the laser beam on said linear light sensitive detector.

Figure 7:
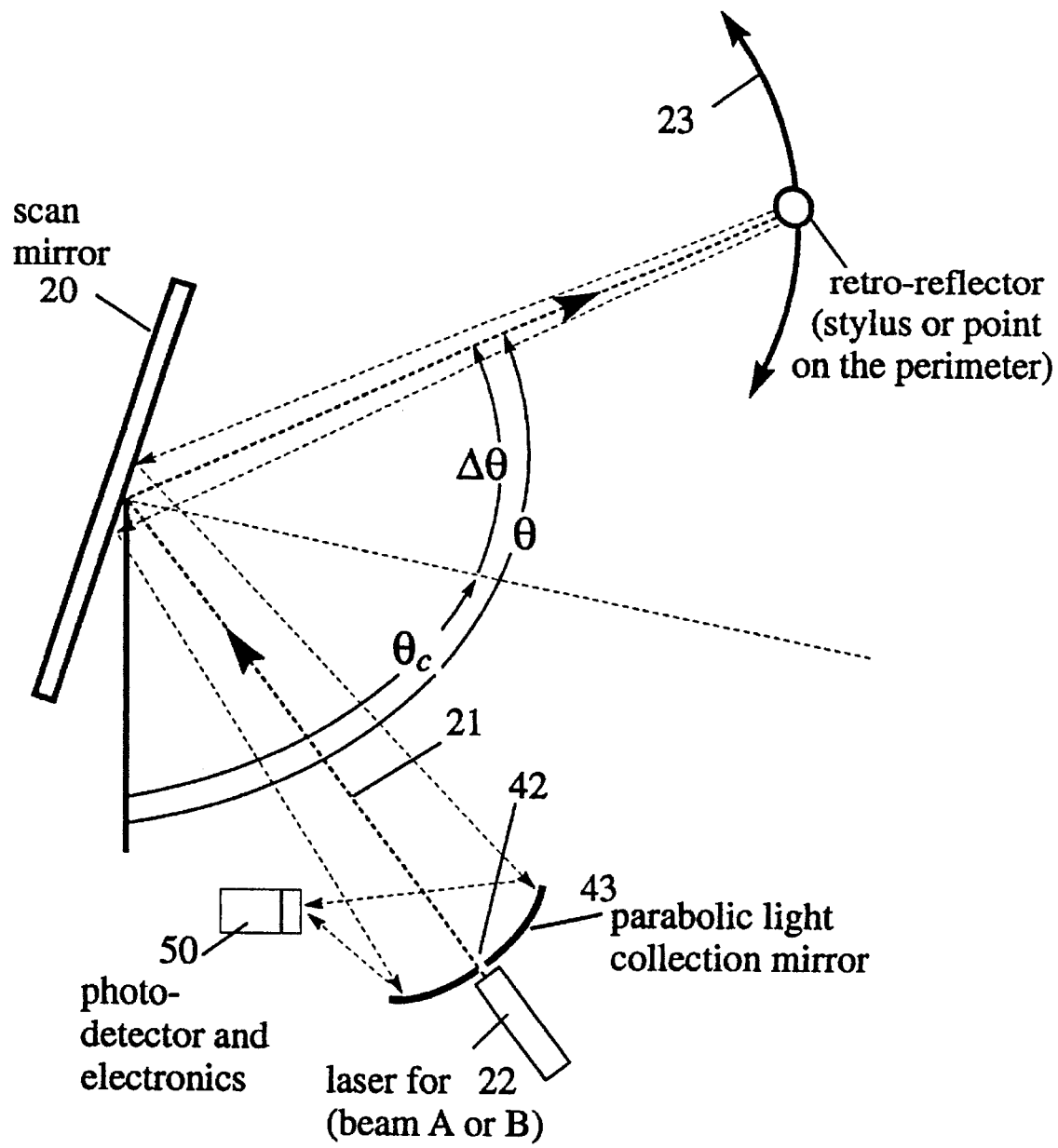

Referring to FIG. 7, it is obvious from the geometry that the distance to the impingement point (28) of the light beam (27) on the linear detector (29) is linearly proportional to the tangent of the scan angle ($\Delta\theta$) measured from the center of scan. Thus we conclude that the measurable voltage from the angle position sensor is ideally proportional to the tangent of the scan angle: $v=\alpha(i_1-i_2)/(i_1+i_2)=\beta\tan(\Delta\theta)$, where $\alpha$ and $\beta$ are scale factors. The finite thickness of the scan mirror (20) and other small departures from the idealized geometry and circuit linearity will usually result in small departures from these ideal linear proportionalities; these nonlinearities must be accounted for in practice by an accurate calibration.

With reference to FIG. 1, it can be established from geometry that the rectangular coordinates (x, y) of the stylus tip (12) are related to the scan angles ($\theta_1,\theta_2$) corresponding to the two laser beams impinging upon the stylus tip (12) by the pair of equations $$x = \frac{D}{\tan\theta_1 + \tan\theta_2}, \text{ and } y = x\tan\theta_1 \qquad (1)$$

where D is the known distance between the the two laser scan mirror's centers of rotation.

Referring to FIG. 2, we address how to determine the two values of $\tan\theta_i$ needed to calculate the coordinates in Eq. (1). Each mirror's scan position is measured by reflecting a laser off the back side of the scan mirror onto a linear light detector. The linear position sensor depicted in FIG. 2 is a device which amplifies two measured currents ($i_2, i_2$) that are linearly sensitive to the location of the laser beam reflection off the back of the scanning mirror. The current imbalance $(i_1-i_2)/(i_1+i_2)$ is formed because it has been found to be a near-linear function of the beam impingement centroid displacement along the linear detector, as measured from the point (the sensor null) where the two currents are equal. A signal amplification $\alpha$ is applied by a signal conditioning circuit to make the sensor output voltage $v=\alpha(i_1-i_2)/(i_1+i_2)$ compatible with computer signal acquisition and analog-to-digital (a/d) conversion for computation.

Thus, from geometry of FIG. 2, the sensor output voltage v is nominally proportional to the tangent of $\Delta\theta$, the angle of the laser beams away from center of scan. Recall that two or more such laser beams are scanning and each has a mirror position detector whose output voltage $v_j$ is a near linear function of $I_j=\tan\Delta\theta_j$, measured from the center of scan (see FIG. 2). Since it is most advantageous to avoid the necessity of trigonometric function calculations, we determine from calibration a function $f_j(v_j)$ for each sensor, such that $I_j=\tan\Delta\theta_j=f_j(v_j)$. We discuss a procedure to find this calibration function $f_j(v_j)$ below. Using a trigonometric identity for the tangent of the sum of two angles $(\theta_{cj}+\Delta\theta_j)$, permits the tangent of the two laser angles $(\theta_1,\theta_2)$ to be determined directly as a function of the calibrated position measurements $I_j=\tan\Delta\theta_j$. By letting $c_j=\tan\theta_{cj}$ denote the constant tangents of the scan angles $(\theta_{cj})$ to the center of scan, an equation for scan angle tangents $\tan(\theta_j)=\tan(\theta_{cj}+\Delta\theta_j)$ can be found, using a trigonometric identity, as the following equation:

$$\tan\theta_j = \tan(\theta_{cj} + \Delta\theta_j) \equiv \frac{\tan\theta_{cj} + \tan\Delta\theta_j}{1 - \tan\theta_{cj}\tan\Delta\theta_j} = \frac{c_j + I_j}{1 - c_j I_j}, j=1,2 \quad (2)$$

The rightmost fraction of Eqs (2) provide a simple algebraic means to produce the tangents $(\tan\theta_j)$ of the scan angles, precisely the result needed in Eq. (1) to compute the stylus rectangular coordinates. Notice that, using Eqs. (2), we can avoid computing any transcendental functions in the computation of $\tan\theta_j$, given previously calibrated values for the geometric constants $c_j=\tan\theta_{cj}$ and, of course the calibrated functions $I_j=f_j(v_j)$. Since evaluating trigonometric functions require orders of magnitude more time on a digital computer than simple additions, multiplications and divisions, equation (2) has important practical implications on higher scan frequency and less expense/complexity of implementation as discussed further below. We observe that our preferred embodiment has a nominal geometry such that $$\theta_{cj} = \text{center of scan angle} \approx \frac{\pi}{4}, \text{ so that } c_j = \tan\theta_{cj} \approx 1,$$

so the above formulas can be further simplified (approximately) for the most ideal configuration. However, for precision implementations like the preferred embodiment, it is necessary that the actual (constant) center of scan tangents $c_j=\tan\theta_{cj}$ be determined from calibration of each system.

To account for the departures from the ideal geometry and linearity of the sensor, we have established that the tangent of the instantaneous scan angle can be very accurately approximated from calibration data as the following polynomial function $f_j(v_j)$ of the two mirror position sensor's output voltage $$I_j = \tan\Delta\theta_j = f_j(v_j) = \sum_{n=0}^{N} b_{nj} v_j^n, j = 1,2 \quad (3)$$

where the $b_{nj}$ are calibration constants. For precisely manufactured scanners such as those made by Laser Scanning Products, Santa Rosa, Calif., it is found that the linear terms of Eq. (3) are typically an order of magnitude larger than the nonlinear terms and that $N<6$ is usually sufficient to provide a fit accurate to better than one part in $10^5$ over $\pm 45°$ scans as required in our preferred embodiment. Ideally, it is obvious from geometry of FIGS. 2 and 7 that $I_j=\tan\Delta\theta_j$ is a linear function of displacement on the light sensitive linear detector which is proportional to the sensor voltage $v_j$. However, weak nonlinearties arise from several sources, including small geometric offsets of the mirror surface from the center of scan, beam offsets from the center of the mirror, and electronic nonlinearities. All of these can be absorbed into the calibration fit $f_j(v_j)$ of Eq. (3), given m=N+1 or more measurements of the position sensor's output voltages (v's) corresponding to beam reflections off targets at known positions.

The calibration process, nominally needs to be done only once after manufacturing, and involves measuring the scan mirror position sensors' output voltage when the laser beams impinge off targets placed at m calibration points (m>N), where the scan angles are known. The calibration constants can be computed using the standard method of least squares (see the text: J. L. Junkins, "Least Square Approximation", *An Introduction to Optimal Estimation of Dynamical Systems*, Sijthoff-Noordhoff, Leyden, The Netherlands, 1978, pp. 1–44) as the following pair of matrix equations:

$$\begin{Bmatrix} b_{0j} \\ b_{1j} \\ \cdot \\ \cdot \\ \cdot \\ b_{Nj} \end{Bmatrix} = (A_j^T A_j)^{-1} A_j^T \begin{Bmatrix} \tan\Delta\theta_{j_1} \\ \tan\Delta\theta_{j_2} \\ \cdot \\ \cdot \\ \cdot \\ \tan\Delta\theta_{j_m} \end{Bmatrix}, j=1,2 \quad (4)$$

where $A_j$ is the Vandermonde matrix containing powers of the measured voltages corresponding to the known targets' scan angles $\Delta\theta_{ji}$:

$$A_j = \begin{bmatrix} 1 & v_{j_1} & v_{j_1}^2 & \cdots & v_{j_1}^N \\ 1 & v_{j_2} & v_{j_2}^2 & \cdots & v_{j_2}^N \\ \cdot & \cdot & \cdot & & \cdot \\ \cdot & \cdot & \cdot & & \cdot \\ \cdot & \cdot & \cdot & & \cdot \\ 1 & v_{j_m} & v_{j_m}^2 & \cdots & v_{j_m}^N \end{bmatrix}, j=1,2 \quad (5)$$

Figure 10:
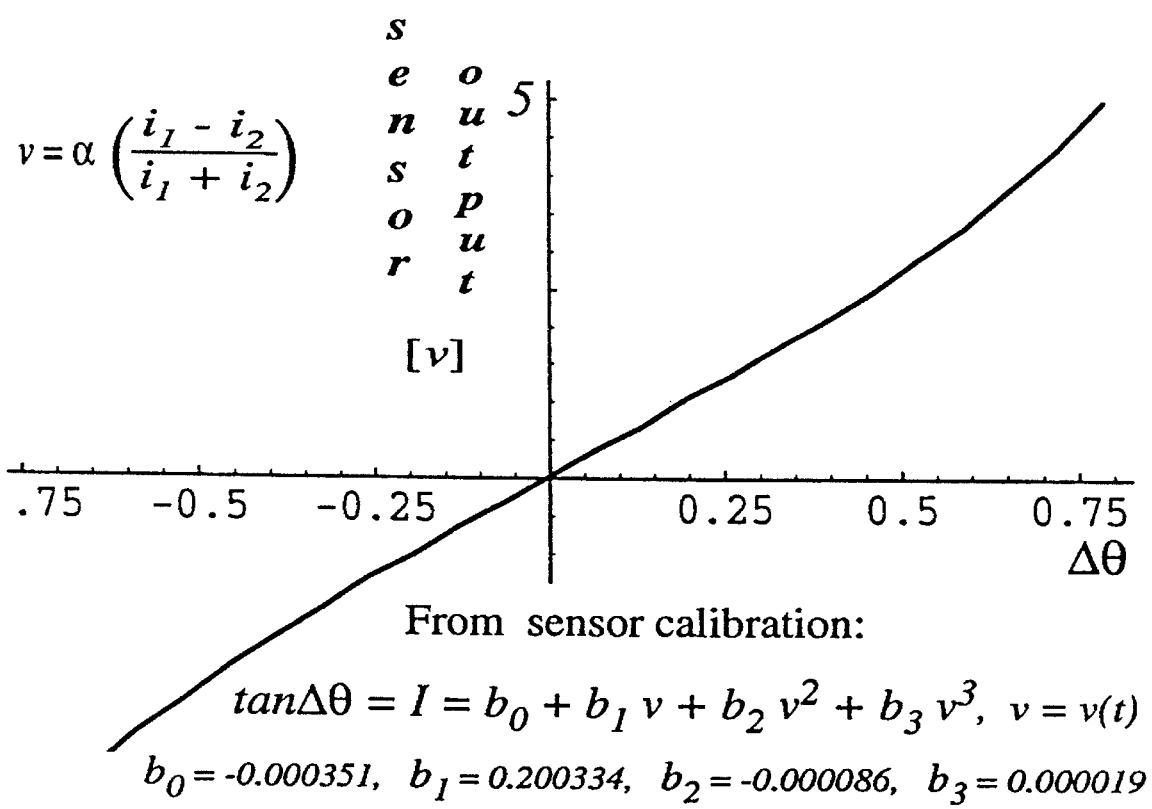

In addition to the necessary initial calibration following manufacture of the scanner system, our preferred embodiment has several internal reflective targets (inside the scanner housing) which are impinged at the beginning and end of each mirror scan. These end-of-scan measurements can be checked on every scan versus their previously measured values to generate an error signal to trigger any required recalibration of the sensor using Eqs. (4), (5). Since the more extensive calibration calculations of Eqs. (4) and (5) will be needed rarely, occasional re-calibration (due to electronic or mechanical aging effects) will not hamper the routine operation of the system. Typical behavior of the scan mirror position sensor output voltage as a function of scan angle is shown in FIG. 10, along with the corresponding calibration coefficients for Eq. (3), determined by Eqs. (4), (5).

Using Eqs. (2) in Eqs. (1), we see that the triangulation formulas [to determine the rectangular coordinates of the stylus center from the calibrated mirror position sensor outputs $I_j$] reduce to the final, exceptionally simple algebraic expressions:

$$x = \frac{D}{\left(\frac{c_1+I_1}{1-c_1 I_1}\right) + \left(\frac{c_2+I_2}{1-c_2 I_2}\right)}, y = x\left(\frac{c_1+I_1}{1-c_1 I_1}\right) \quad (6)$$

As a direct consequence of the fact that the calibrated scan mirror position sensor output is $I_j=\tan\Delta\theta_j$. We have been able to obtain these efficient triangulation formulas [Eqs. (6)] that are ideal for real-time computation of the rectangular coordinates (x, y), since they contain no transcendental functions. As a result of obtaining these equations [Eqs. (6)], it is possible to very efficiently implement the triangulation process to determine the stylus coordinates (x, y). Equations (6), are unique; we claim that they have not been employed in any of the previous inventions on laser scanning and triangulation, and they are a central important feature as regards the efficiency of the practical implementations based on the present invention. Either analog or digital computation may be used. If digital computations are used to determine (x, y), the absence of transcendental functions in Eqs. (6), the small computational delay means that extremely high scan rates can easily be accommodated even with an inexpensive microprocessor. The simple form of Eqs. (6), involving only elementary addition, multiplication and division operations, also enables a correspondingly simple circuit to be implemented so that the (x, y) can be obtained as analog outputs, and thus an analog implementation or the position determination is feasible, however it presents difficulties as regards re-calibration. In the preferred embodiment, we implement both the calibration calculations [Eqs. (4) and (5)], and the real-time triangulation calculations [Eqs. (3) and (6)] in the same digital computer, with a real-time analog-to-digital conversion of the mirror position signals to obtain the digital values of the sensor output voltages $v_j$ [needed to produce the calibrated sensor output $I_j$ in Eq. (3)] as shown in FIG. 10.

Mechanical Aspects of the Preferred Embodiment

Figure 19A:
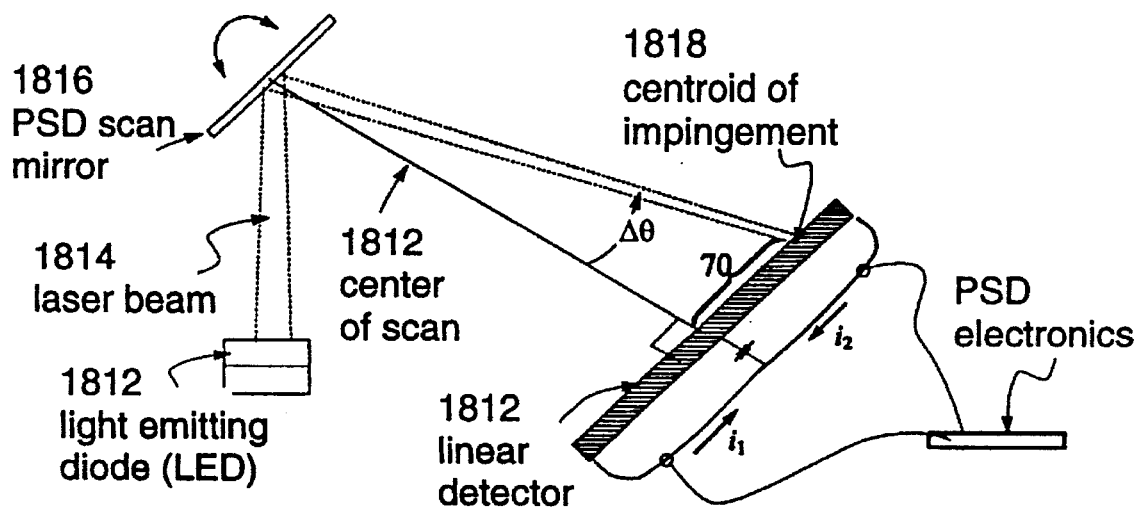
FIG. 19A shows the principal optical and electro-optical elements of the Position Sensing Detector (PSD).
Figure 19B:
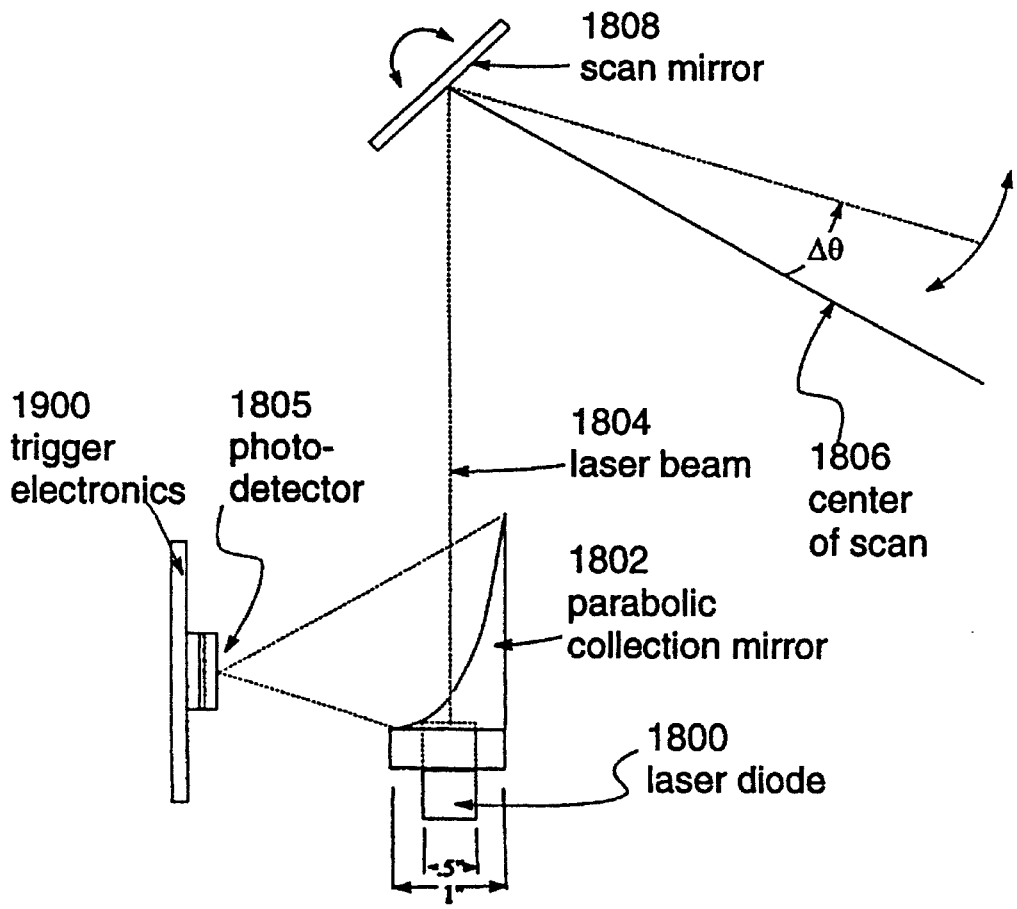
FIG. 19B shows the principal optical and electro-optical elements of one of two or more laser scanners.
Figure 20:
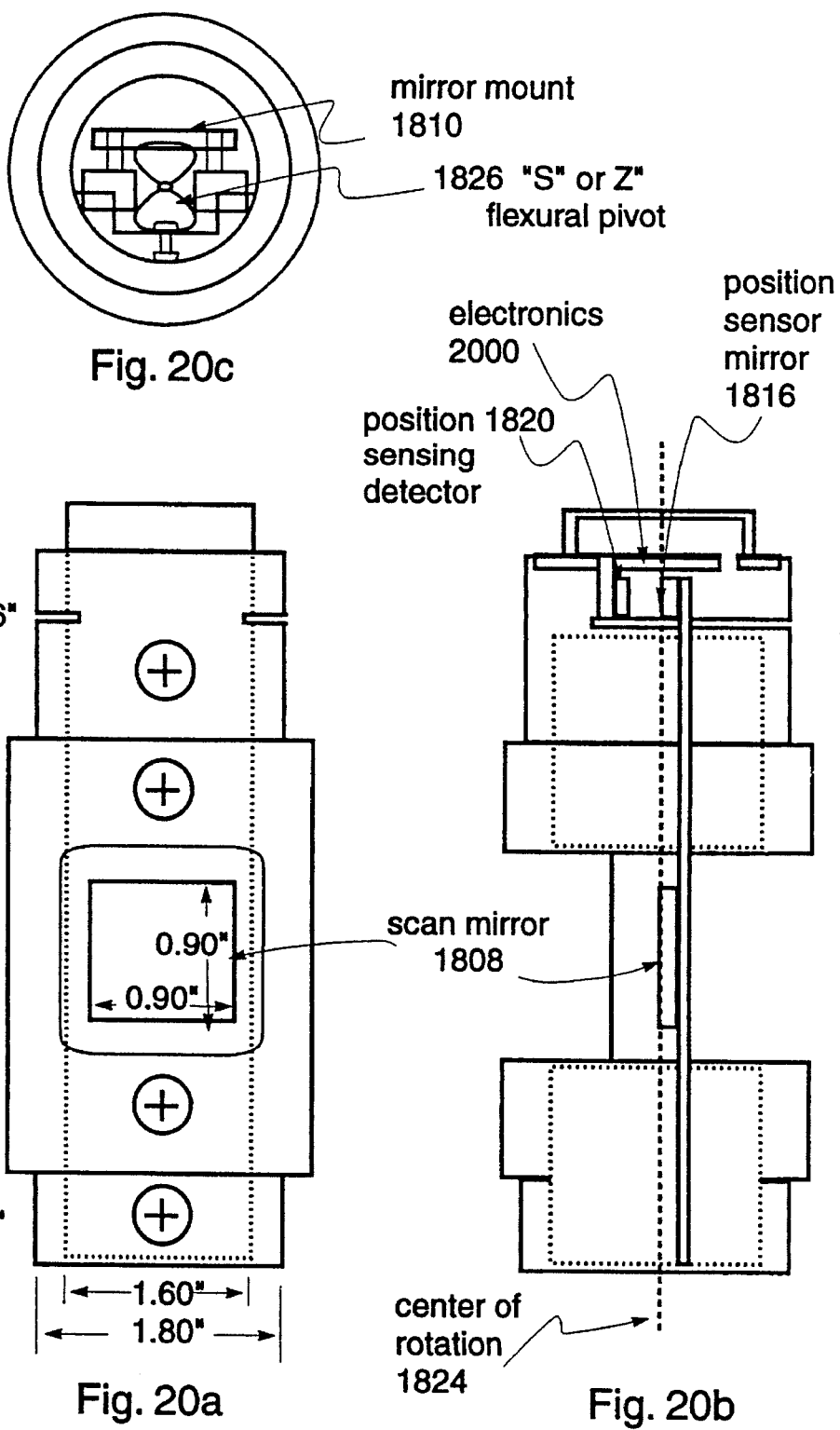
Figure 22:
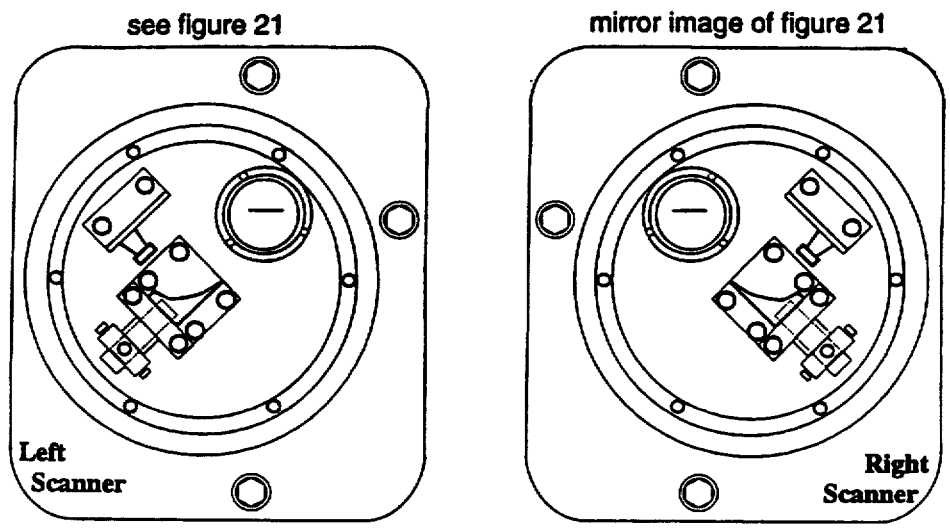
Figure 23:
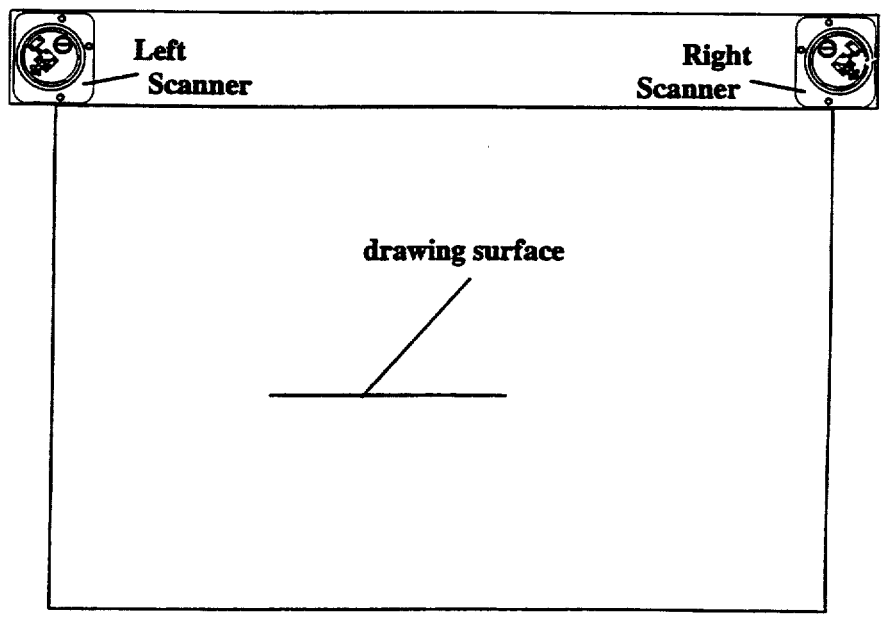

With reference to FIGS. 18–23, the mechanical aspects of the preferred embodiment are considered. In the preferred embodiment, there are two scanner systems mounted as shown in FIG. 23. Each scanner system (FIG. 18A) consists of five major elements: (1) a primary laser source (1800), (2) a parabolic mirror (1802), (3) a scan mirror (1822), (4) a laser diode (1812), and (5) a position sensor (1820). In FIG. 18A, a three dimensional exploded sketch shows the major mechanical and optical elements with the approximate dimensions of the scanner given in the sketch of FIG. 18B. The flexural pivot (1826) is of the S or Z type as discussed in U.S. Pat. No. 4,732,440 and manufactured by Laser Scanning Products of Santa Rosa, Calif. This pivot is designed such that the beam (1832) sweeps through a total scan angle in excess of 90 degrees with a frequency of 80 cycles per second. The major elements are the laser diodes (1800 and 1812), the parabolic collection mirror (1802), the oscillating, rigidly connected mirrors (1808 and 1824), the position sensing detector (1820), and the photo detector (1805). An electro magnetic actuator (1822) drives the scanner with a sinusoidal torque having a frequency of 80 cycles per second and an amplitude tuned to give the correct scan amplitude of about 100 degrees peak to peak. Further details are shown in FIG. 19, and engineering drawings of the scanner, scan head design, and mounting geometry are shown in FIGS. 20–23. Each scanner is housed inside a metal canister with a slit which permits the laser beam to scan the drawing surface plane (2300). The scanner geometry is shown to approximate scale in FIG. 20, whereas the preferred embodiment of the (left) scan head is shown at approximate half size in FIG. 21. The flexural pivots (1826) and the mounting bracket (1810) are designed such that the PSD mirror (1824) and the scan mirror (1808) are rigidly attached and oscillate in a co-planar fashion with the center of rotation (1824) tangent to the centerline of both mirrors. The three point mount (2100, FIGS. 21 and 22) permits adjustment of the scan plane height and orientation with respect to the drawing surface (2300). The right scanner and mounting geometry are a mirror image of the left scanner as is shown in FIG. 22. The line connecting the center of scan is displaced from the edge of the drawing surface by a distance of at least six inches to avoid a geometric singularity in the triangulation formulas [Equations (1) and (2)].

Electro-Optical, Electronic, and Data Acquisition Aspects of the Preferred Embodiment Electro-optical Subsystems With reference to FIG. 19, we discuss the electro-optical components and operation of the preferred embodiment. The primary laser source, a 3 milli-watt, 670 nano-meter laser diode (Power Technology, Inc. P/N PM-03-670-50) with self contained focusing optics and power source is positioned (1800) behind an off-axis parabolic reflecting surface (1802). The parabolic surface has approximately a one inch diameter; suitable mirrors are manufactured by Melles Griot, Inc. The primary laser beam (1804) passes through a small hole in the parabolic collector mirror (1802) and is reflected off the scan mirror (1808). The reflected return light from the retro-reflective tape (3M No. 7610), is centered on the outgoing beam (1804), impinges on the parabolic collector mirror (1802) and is focused onto a photo detector (1805). The amplified signal from the photo detector is used to trigger analog-to-digital (A/D) data samples from the position sensing device. Position sensing is accomplished by using a light emitting diode (LED, 1812) centered on 890 nano-meter wavelength to reflect a beam off a mirror (1824) which is executing the same angular motion as the scan mirror (1808). The light reflected off the mirror (1824) impinges on a linear position sensitive detector (PSD, 1820). The 12 mm long detector for the preferred embodiment is made by Hamamatsu, Inc, part no. S3932, which outputs two currents $(i_1, i_2)$. The current imbalance $(i_1-i_2)/(i_1+i_2)$ is proportional, with a sensitivity of as high as one part in 40,000, to the instantaneous displacement (70) of the centroid of the light beam from the LED. Since the distance of the detector (1820) from the center line (1824) of the mirror (1824) axis of rotation is fixed, the current imbalance is ideally proportional to tangent of $\Delta\theta$, the angle from the center of scan. With departures from ideal beam focusing and mechanical/electrical imperfections, experience shows that the calibrated position of the mirror determined by Eqs. (3)–(5) results in the tangents of the scan angles $(I_j=\tan\Delta\theta_j)$ being determined accurate to better than one part in 10,000. A signal conditioning circuit scales the current imbalance $(i_1-i_2)/(i_1+i_2)$ to obtain a voltage $v=\alpha(i_1-i_2)/(i_1+i_2)$, where $\alpha$ is a scale factor determined to make v vary between ±5 volts and thus be compatible with the range for a standard analog signal for computer data acquisition.

Photo Detector Circuit

A conventional photo detector transducer (1805) is used to detect the reflection off the retro reflective tape on the collar (49) of the writing or drawing stylus (30A). The reflected light is spread in a near gaussian fashion about the outgoing laser beam (1804) and is focused by the parabolic collector (1802) onto the detector (1805). The photo detector consists of a light sensitive region and associated circuity that generates an electrical signal whose voltage amplitude is proportional to the intensity of the incident light on the light sensitive detector.

Figure 24:
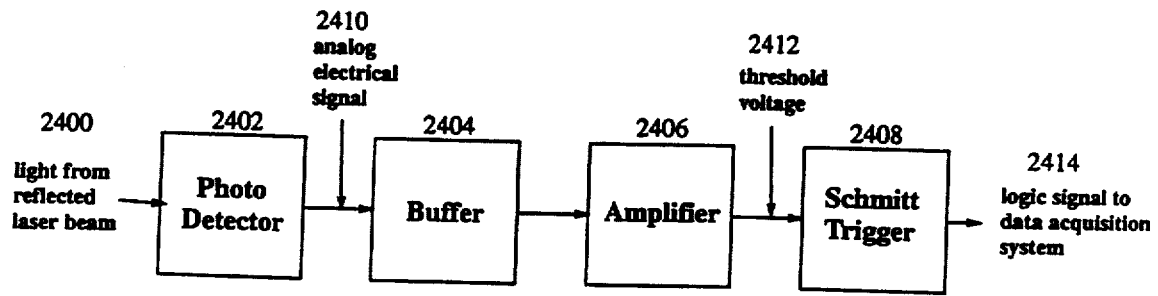

For the preferred embodiment, the photo detector signal is the basis for a data acquisition trigger which causes the PSD (1820) signal to be sampled and thereby measure the tangent of the scan angle. This requires that the photo detector output be processed in such a way that it generates a TTL compatible logic signal to use as a trigger for the data acquisition system. Shown in FIG. 24 is a sketch of the logical circuit that is used in the preferred embodiment to generate the required pulse indicating a reflection from the pen collar. The photo detector circuit (2402) has a variable resistance which can be adjusted to obtain a suitable gain. The gain is determined by the signal to noise ratio of the photo detector output. A buffer (2404) is used to match the impedance of the photo detector (2402) and the amplifier (2406). The amplifier gain is determined by the threshold voltage (2412) of the Schmitt trigger (2408) at the fartherest pen location (typically 3 to 4 m). The Schmitt trigger (3408) is used to convert the analog signal (2410), if it is above the threshold voltage (2412), to the logic signal (2414). In addition, the Schmitt trigger embodies adjustable hysteresis which can be tuned to ensure that noise spikes and mirror signal variations are suppressed, even if they are above the threshold, so that spurious high frequency triggers are not generated. The logic output signal (2414) of the Schmitt trigger (2408) is a negative square TTL pulse upon each pen reflection. Each pulse (2414) output from the Schmitt trigger (2408) is used to trigger the acquisition board to do an A/D conversion of the current PSD signal and thereby measure the tangent of the scan angle. The trigger is tuned so that the A/D sample occurs within less than a microsecond of the pen reflection.

Position Sensing Detector (PSD) Circuit

Figure 25:
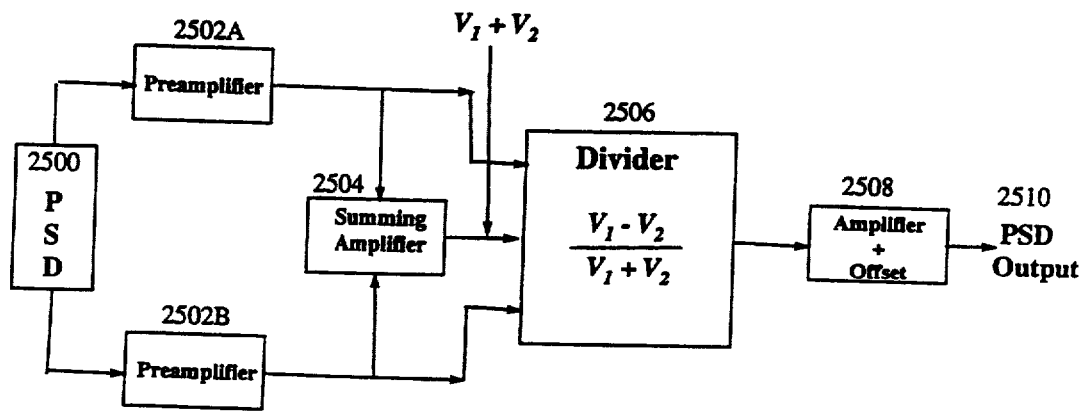

With reference to FIGS. 18 and 25, the PSD is an electrical transducer which can be used to locate the angular position of the scan beam at any instant. The detector generates two variable currents ($i_1$, $i_2$) whose difference is a linear function of the displacement of the centroid (70) along the linear detector (1820). The currents are convened into voltages $V_1$ and $V_2$. The center of the PSD (1820, 2500) is nominally the zero or null point where the two voltages are equal and both equal to zero. The PSD voltages are summed and divided to generate the current imbalance $(V_1-V_2)/(V_1+V_2)=(i_1-i_2)/(i_1+i_2)=\alpha\tan\Delta\theta$. The pre-amplifier voltages $V_1$ and $V_2$ are passed through a summing amplifier (2504) and also fed directly into a divider integrated circuit (IC). This IC (2506) generates an output voltage equal to $(V_1-V_2)/(V_1+V_2)=(i_1-i_2)/(i_1+i_2)$. This voltage is then sent through a final amplifier and offset stage to generate the PSD output voltage (2510) which is approximately $\tan\Delta\theta$. The offset is provided to permit electrical compensation for any mechanical misalignment of the beam on the PSD. Given the PSD output voltages (2510), the precision calibration formulas of Eq. (3) are applied and the tangents of the scan angles computed from Eq. (2); finally, the stylus coordinates are computed from Eqs. (4), then stored or transmitted to other devices for display or further processing. For normal scanner operation, the PSD voltage is approximately a sinusoidal signal at the frequency of the scanner (80 HZ, for the preferred embodiment), but the only points sampled are those A/D conversions triggered by the photo detector trigger circuit of FIG. 24.

Data Acquisition

The signals from the trigger circuit of FIG. 24 are used to determine the location of the stylus. The photo detector circuit generates a negative going pulse at the instant the the laser beam strikes the retro-reflective collar. At this instant, the PSD voltage represents the $\tan\Delta\theta$ corresponding to the beam position when it first generates a reflection off the stylus collar. Notice that the size of the collar is not negligible, and the successive impingements (nominally 1/160 second apart) will be off opposite sides of the cylindrical light reflecting collar. Since very little motion (for handwriting, typically 1 mm) occurs in the small interval between successive impingements, the average of these two measurements gives an approximate pen center location. For more rapidly moving objects, such as in robotic or manufacturing applications, it is necessary to do more sophisticated processing of these successive reflections to determine the center of the reflecting object. The trigger signal (2414) is fed into the external convert of the data acquisition board. This input is programmed as a hardware trigger to cause the reading of an analog voltage from the input channel (1104, 1106) attached to the PSD output (2510). This discussion applies to both the left and right scanners and the output which results is a pair of voltages ($v_1$, $v_2$) approximately equal to the tangents of the scan angles measured from the center of scan ($\tan\Delta\theta_1$, $\tan\Delta\theta_2$). These voltages (FIG. 12) are the basis for all further processing.

Data Processing

Figure 11:
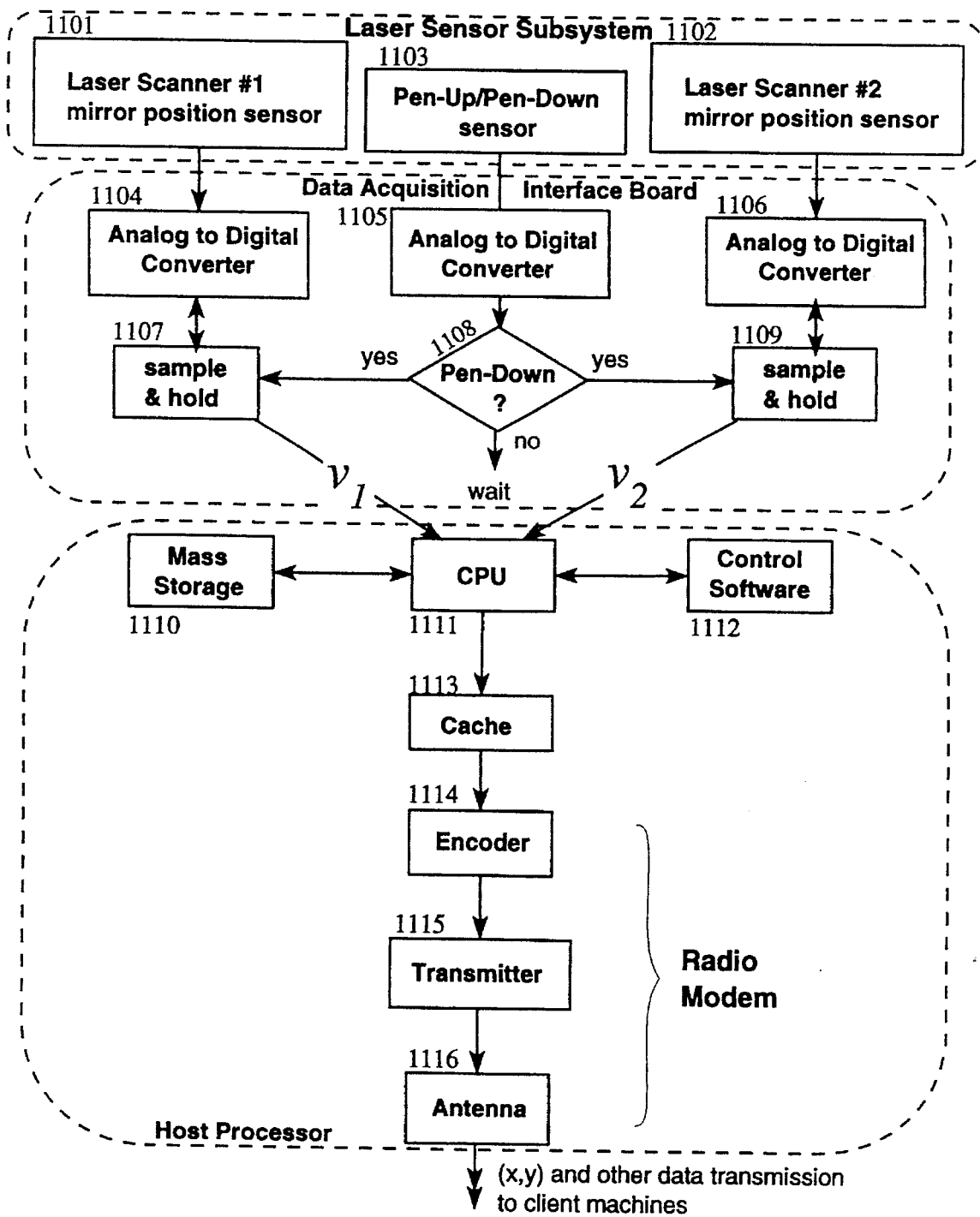
Figure 12:
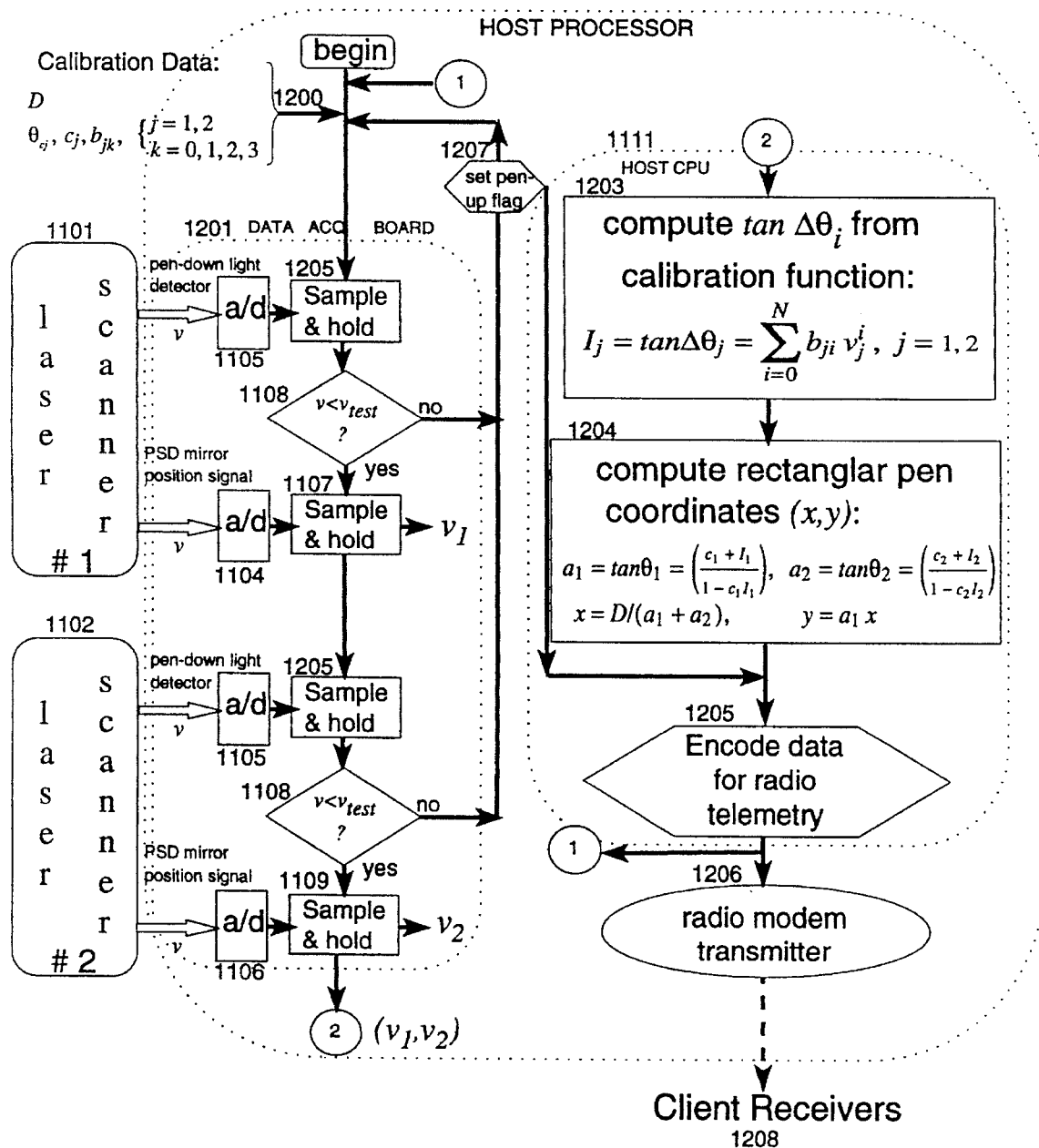

FIGS. 11 and 12 also shows the functional subsystems and logic flow for the calculations of the (x, y) coordinates in the context of the preferred embodiment described below which involves a plurality of client machines each having separate graphic input systems. In the host central processing unit (CPU), the previously computed calibration constants are used to convert for any mechanical or electrical nonlinearities and convert the measured voltages ($v_1$, $v_2$) into the calibrated values for ($\tan\Delta\theta_1$, $\tan\Delta\theta_2$) using the calibration formula of Equation (3). The calibrated values of ($I_1$, $I_2$)= ($\tan\Delta\theta_1$, $\tan\Delta\theta_2$) are then used in Eq. (6) to compute (x, y). These calculations can be repeated several thousand times per second in many readily available microprocessors, since there are no transcendental function evaluations, therefore equations (2) and (6) are very important as regards computational efficiency and reducing the expense of practical implementations. FIGS. 11 and 12 indicate the additional aspects of the data processing required to generate the radio transmission of the (x, y) data to the client machines. These aspects are straightforward for those involved with interfacing computers and communication systems, so these are not discussed in detail here.

Automatic Note-Taking Concepts

Figure 13:
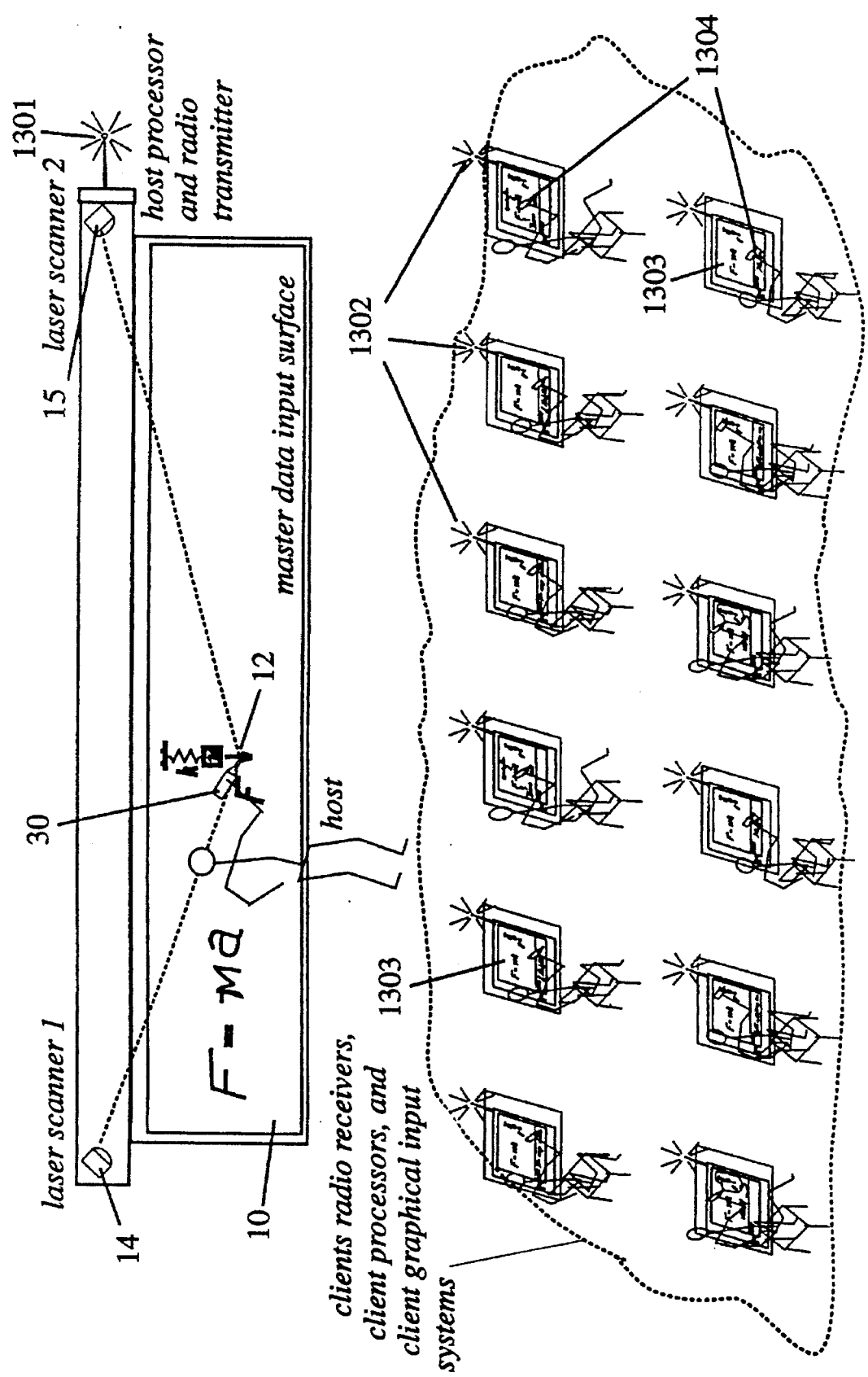
Figure 16:
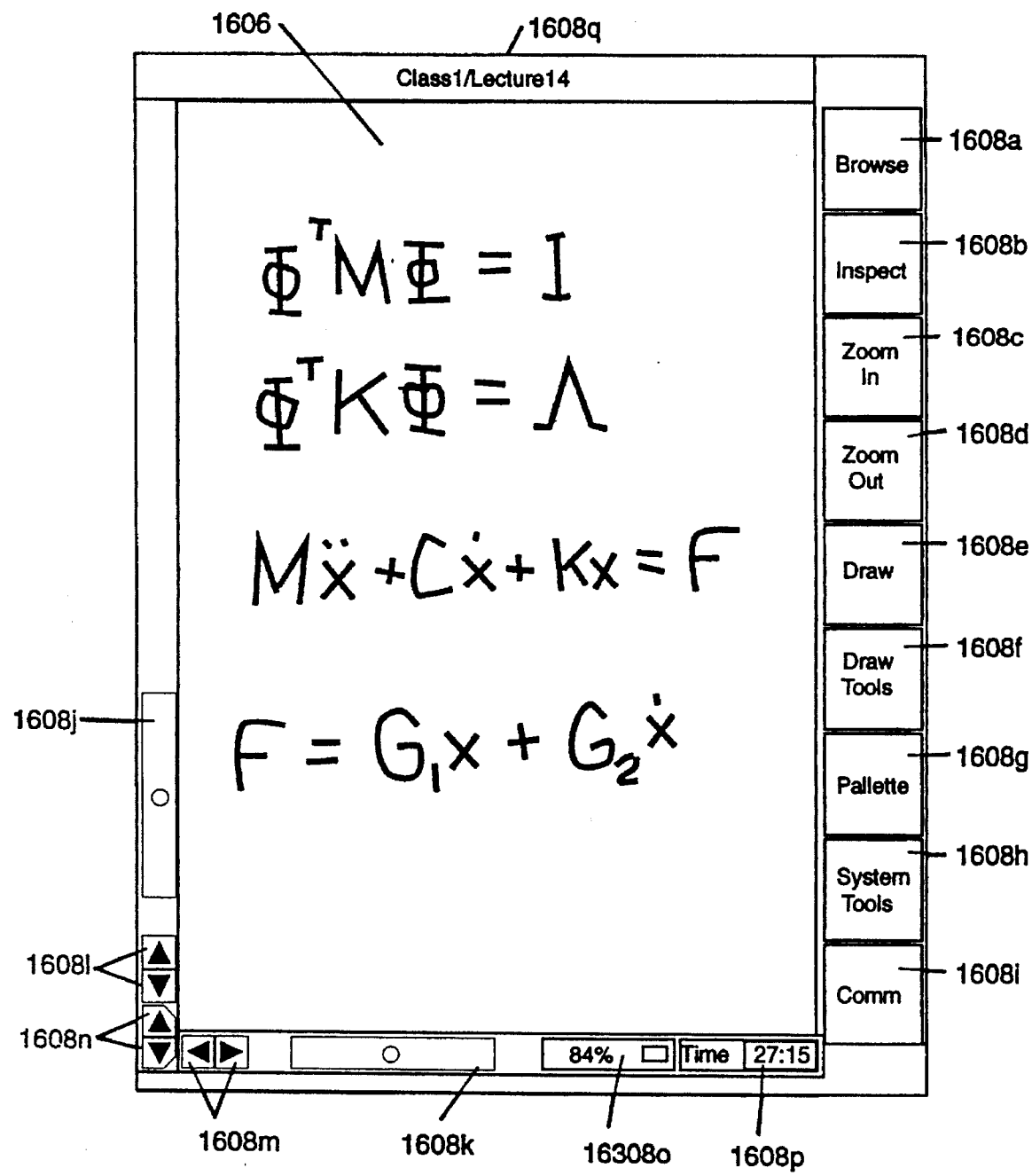
Figure 17:
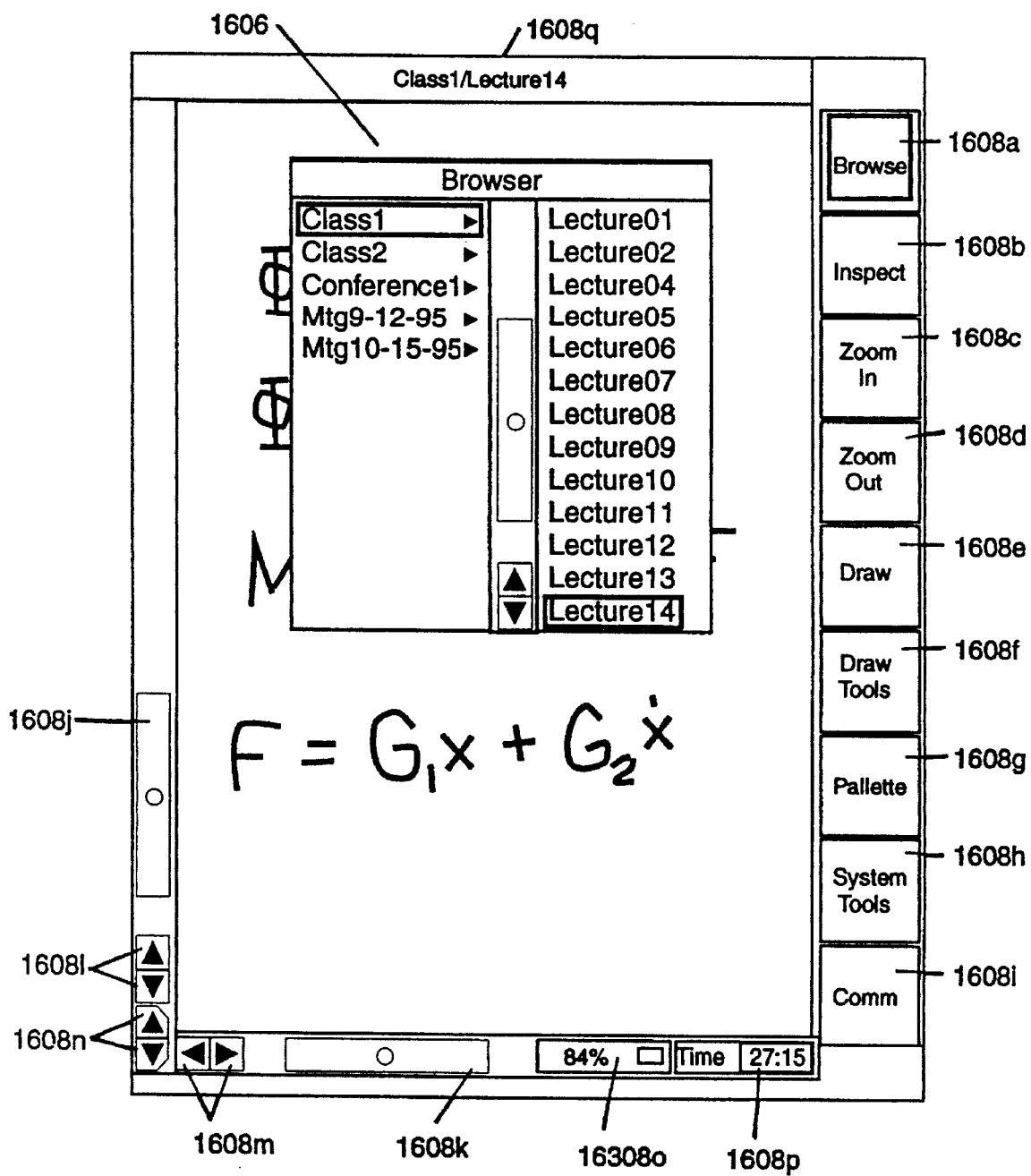

Referring to FIG. 13, we now describe aspects of the preferred embodiment in which the (x, y) coordinates obtained from the above said laser scanning process are transmitted via wireless means (e.g., radio or infrared transmissions) to a plurality of portable devices (client machines). Each client machine is a computer equipped with a separate graphical input device (e.g., a "PenPC" with a touch sensitive screen and writing stylus) and programmed to permit the transmitted information to be displayed and individually manipulated on each client's screen. Major elements and subsystems of the client machines are shown in FIGS. 11 and 12. Under the control of the client machine software described below, the clients can individually annotate, edit and customize the hand-written or hand-drawn information using their respective graphic input devices. Referring to FIGS. 14–17, each client machine can perform functions such as zooming and scrolling so that any portion of the master data surface can be magnified to occupy the client's screen. Each client can individually erase, delete, copy, and paste on any portion of their respective current screens. Additional editing features of the client software are illustrated in FIGS. 16 and 17. Observe that the storage and subsequent playback of the information acquired in this automatic note-taking concept will preserve the "progressive disclosure" nature of lecture material and the client's additional superimposed notes and annotations. Observe that an obvious extension of this graphical data acquisition system is to also acquire analog or digital voice annotations which could also be stored with time as the independent variable for storage/access of both the graphical and voice data. We now discuss further details of FIGS. 11–17 of the preferred embodiment.

The implementation of the data acquisition and calculation of the (x, y) coordinates, in a digital computer is addressed in FIGS. 11 and 12. In FIG. 11, the laser scan mirrors' positions are sampled by a/d converters (1104 and 1106) every time the stylus is detected by the pen-down detector (1105). The digitized voltages ($v_1$, $v_2$) from the scan mirror position measurement are input to the computer's central processing unit (CPU, 1111), where the (x, y) coordinates are calculated using the control software (1112). The (x, y) points so calculated can be stored in the host machine mass storage device (1110) and also transmitted via the radio modem to the client machines. The process initiates with the reading (from mass storage) the values (1200) for the system calibration data (D, $\theta_{cj}$, $c_j$, $b_{ji}$). FIG. 12 is another view of this process emphasizing further details. The acquisition of the signals from the laser scanners (1101 and 1102) is under the control of a data acquisition board (1201). The pen-down sensor signal is digitized (1105) and tested (1108). If the stylus is present, the mirror position sensor voltages ($v_1$, $v_2$) are sampled (1104, 1106) and held (1107, 1109) for input into the central processing unit (1111). Blocks (1203) and (1204) are the key calculations which need to be performed in real time. In Block 1203, the calibration constants $b_{ji}$ are used to compute, from the mirror position sensor voltages ($v_1$, $v_2$), the calibrated values ($I_1$, $I_2$) which equal the scan angle tangents ($\tan\Delta\theta_1$ and $\tan\Delta\theta_2$). Block 1204 computes the digitized (x, y) coordinates from Eqs. (6). Block 1206 transmits the encoded (x, y) coordinates to the client computer receivers (1208).

FIG. 13 shows the preferred embodiment in which a stylus (30) is marking (12) on a large data surface (10). The digitized (x, y) information is determined from laser scanners (14, 15) and transmitted (1301) by wireless means to client receivers (1302). The plurality of client computers are programmed to display the (x, y) information, or a portion thereof, on the client computer screens (1303). The client computer screens (1303) are touch sensitive to a stylus (1304). The clients can individually annotate the lecture information appearing on their touch sensitive screens and can perform a variety of other manipulations of this information, as illustrated in FIGS. 16 and 17.

Figure 14:
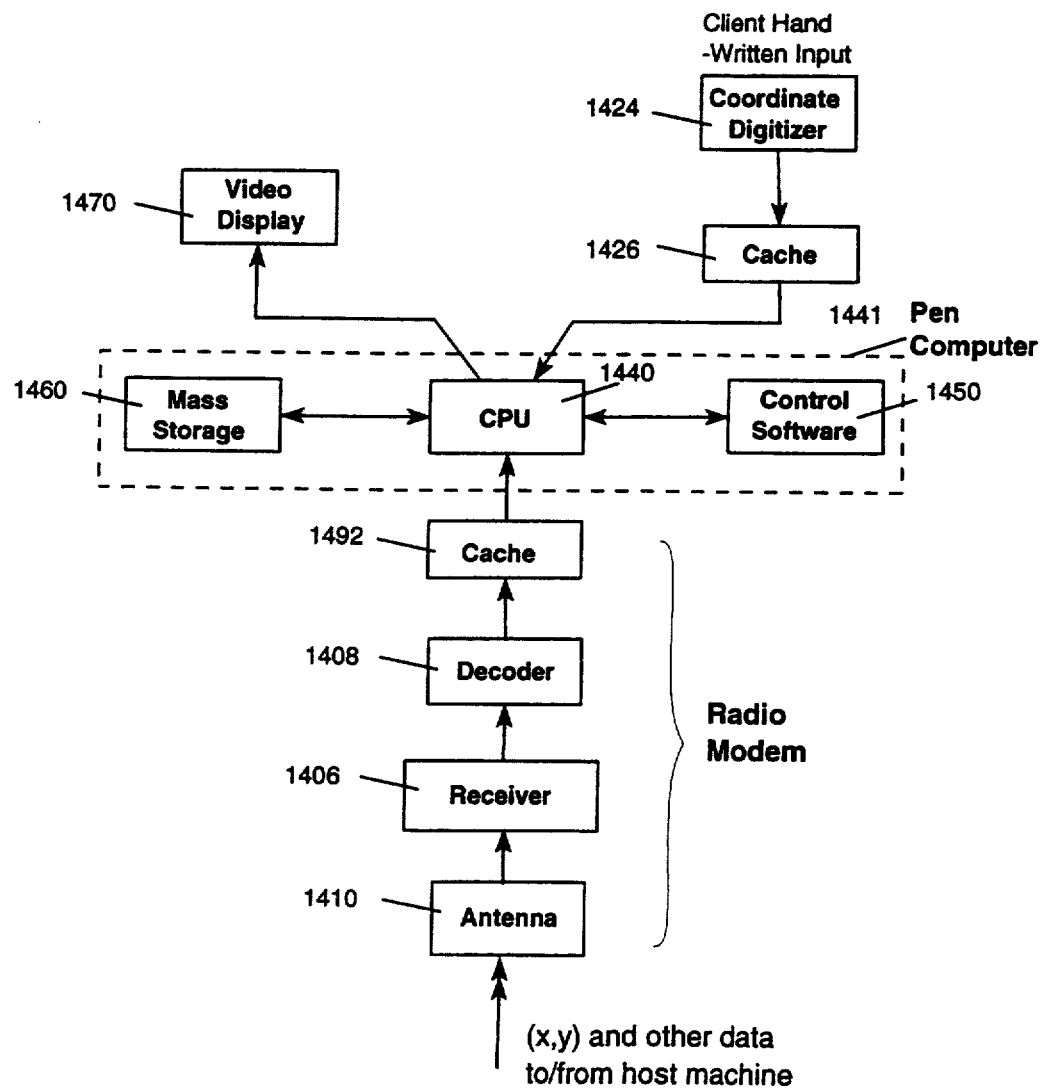
Figure 21:
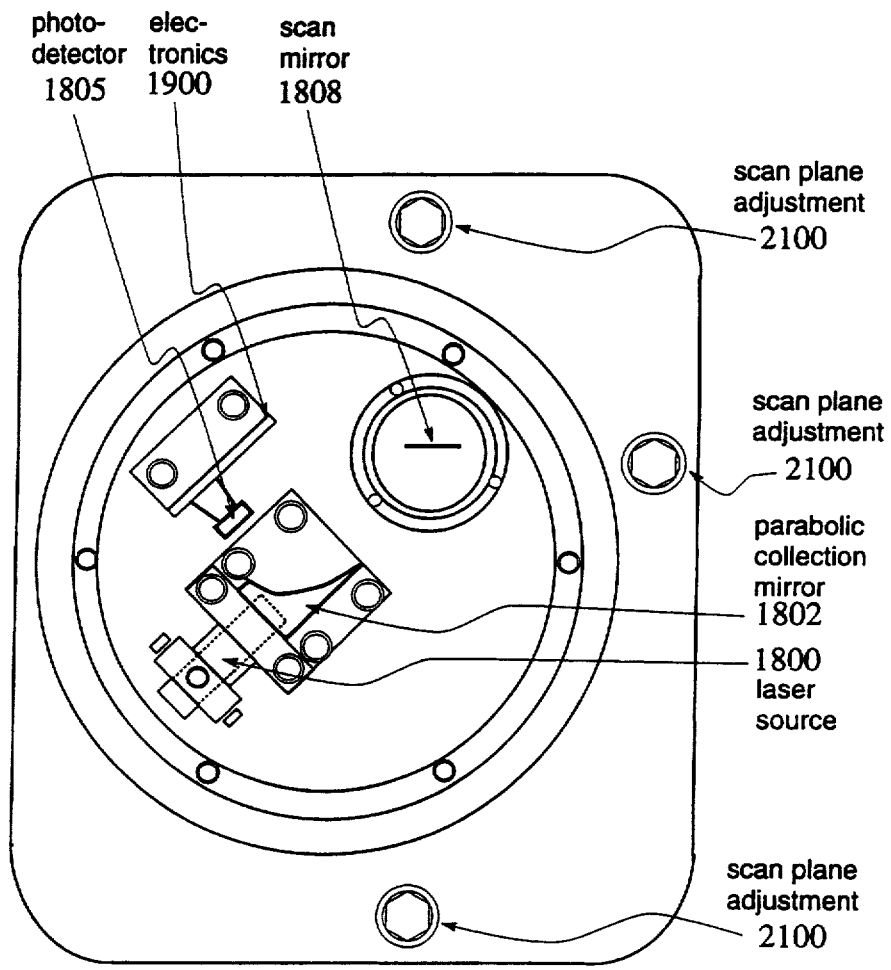

FIG. 14 shows a functional schematic of a typical client computer. The (x, y) information from the host machine is received by the client antenna/receiver (1410, 1406), decoded (FIG. 12), and stored in a memory cache (1492). This data is accessed by the client CPU (1440) and under the control of software (1450), is drawn on the video screen (1460). The client computer also has a touch-sensitive screen or similar digitizing graphic input device (1492) whereby additional client hand-written and hand-drawn input can be made (1426) to the client computer's CPU (1440). This input can be used to control the software features and to annotate the information displayed on the client video display (1470).

Figure 15:
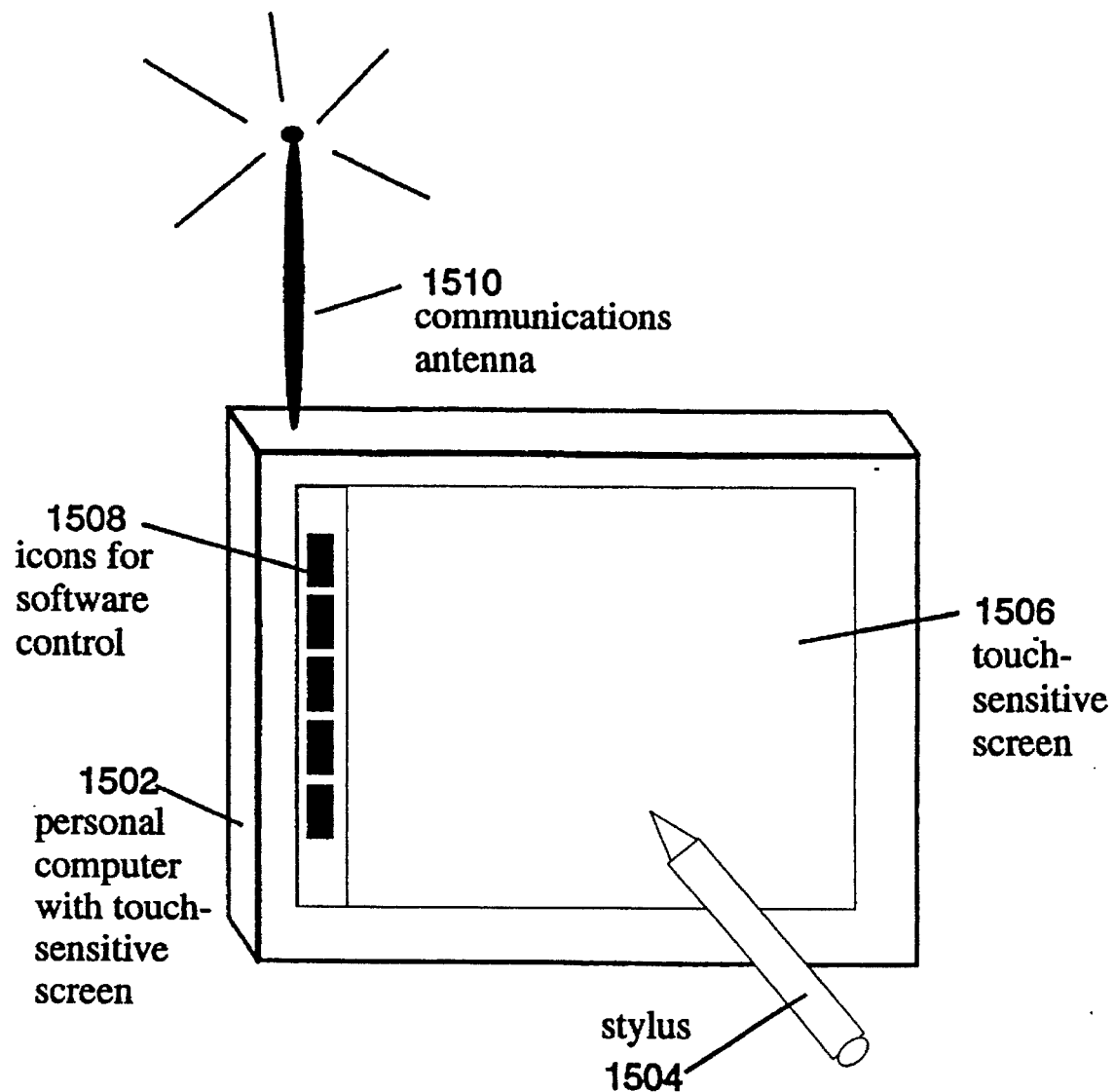

FIG. 15 shows the main features of a typical client computer screen (1502). The information from the host is received by the radio antenna (1510) or some other wireless means. The touch-sensitive screen (1303) can be marked on by the hand-held stylus, which also is used to exercise user control and other client software options, typically executed by touch-sensitive control icons and selections from a family of menus (1508).

FIGS. 16 and 17 show a typical screen on a client's screen (1605) during a lecture. The information displayed on the screen will in general be a mixture of the information transmitted from the host (FIG. 13) and the client computer user's additional hand-written input (FIG. 14). The portion of the master data surface (10, FIG. 13) currently displayed on the client green (1606, FIG. 16) is controlled by the client stylus input by moving the slide bars (1608j and 1608k) and clicking the arrows (1608l and 1608m). Previously erased boards of information can be viewed by clicking on the page-up/page-down controls 1608n. The magnification of the displayed information is controlled by clicking on the zoom controls (1608c, 1608d). The percentage of zoom is displayed in 1608o. The zoom feature has obvious importance in large lecture halls, especially for vision-impaired clients or clients having other handicaps which preclude intensive note-taking. All of these features can have preferences set so that they are controlled by default logic and only require special pen commands to over-ride the client's custom-tailored default logic.

Many other routine edit features can obviously be incorporated. For example, frequently needed objects such as squares, circles, ellipses, circuit element symbols, etc., can be invoked from Draw Tools (1608f) or from a previously stored Palette (1608g). Also (FIG. 17), the the Browsing feature can be invoked by clicking icon 1608a and then the directory or file name desired. Clicking icon 1608a opens the Browser window (1701), showing a typical directory/file organization. The "cut and paste" operation to extract information from previous files can be done solely using client stylus input. While these are the main features, they are intended for illustration purposes; they are not all-inclusive.

We claim:

1. A graphic input system for digitizing the location of an object moving on a planar surface, comprising:

at least two primary scanning lasers each delivering scanning light beams from above said planar surface, a scanning mirror interposed along the path of each of said scanning light beams and each scanning mirror being controllably pivotally mounted so as to deflect the path of each of said scanning light beams, the arrangement being such that the scanning light beams from each of said primary scanning lasers is controllably driven across said planar surface through electromagnetic excitation of each scan mirror, a marking stylus arranged to be moved over said planar surface, a detecting means for detecting the impingement of each of said scanning light beams from said primary scanning lasers on said marking stylus, said detecting means for generating a trigger voltage signal, the trigger voltage signal being transmitted to a logical circuit means for enabling the reading of the instantaneous value of a position voltage signal proportional to and representative of the tangent of the scan angle of each said scanning light beam.

2. The graphic input system as defined in claim 1 where said electromagnetic excitation causes said scanning mirror to execute an angular oscillation in a resonant harmonic vibration mode.

3. The graphic input system as defined in claim 2, where said scanning mirror is mounted on mutually crossed flexural pivots, or where the scanning mirror is a uniformly rotating element.

4. The graphic input system as defined in claim 2 where the signal generated is of a value proportional to the tangent of the scan angle for directly computing the stylus (x,y) coordinates.

5. The graphic input system as defined in claim 1 wherein said detecting means for detection of impingement of the scanning light beams of each said primary scanning lasers utilizes a retro-reflecting means mounted on said marking stylus.

6. The graphic input system as defined in claim 5 wherein said retro-reflecting means consists of a collar on the marking stylus.

7. The graphic input system as defined in claim 3 wherein said detecting means for detection of impingement of the scanning light beams of each said primary scanning lasers utilizes a retro-reflecting means mounted on said marking stylus.

8. A laser scanning means for determining the location of a marking stylus on a moving object such as a robotic positioning system element wherein:

(a) at least two scan planes are present and wherein a plurality of laser beams scan the first of said scan planes by a locational scanning means to provide locational signals on said first scan plane and wherein the other of said scan planes is utilized for on/off locational information for surface contact detection, and wherein said locational signals are generated by laser scanning beams controllably moving across said first scan plane for detection by beam locational detecting means;

(b) reflection means for each laser beam arranged on said marking stylus, the reflection from said reflection means being delivered to said beam locational detecting means to directly provide a signal proportional to and representative of the tangent of the scan angle at detection time.

9. The laser scanning means as defined in claim 8 wherein said locational scanning means are resonant scanners and traverse the first of said scan planes with said laser beams.

10. The laser scanning means as defined in claim 9 wherein said detecting means for said locational scanning means are position sensitive detectors.

11. The laser scanning means as defined in claim 9 wherein said detecting means for said locational scanning means consist of a reflective means located on said marking stylus, and wherein said reflecting means directs said scanning light beams from each of said primary lasers onto a detector which detects the presence of the marking stylus.

12. The laser scanning means as defined in claim 11 wherein said reflecting means are retro-reflectors.

13. A graphic display system as defined in claim 10 wherein said signals from said detecting means are digitized and delivered as input to a note-taking device, a storage device, and a screen display device remotely located from said laser scanning means.

14. The graphic input system as defined in claim 2 where said scanning mirror is mounted on mutually crossed flexural pivots, or where the scanning mirror is a galvanometric scanning element.

15. A graphic input system for digitizing the location of an object moving on a planar surface, comprising:

at least two primary scanning lasers each delivering scanning light beams from above said planar surface, a scanning mirror interposed along the path of each of said scanning light beams and each scanning mirror being controllably pivotally mounted so as to deflect the path of each of said scanning light beams, the arrangement being such that the scanning light beams from each of said primary scanning lasers is controllably driven across said planar surface through electromagnetic excitation of each scan mirror, a marking stylus arranged to be moved over said planar surface, a detecting means for detecting the impingement of each of said scanning light beams from each primary scanning lasers on said marking stylus, said detecting means for generating a trigger voltage signal, the trigger voltage signal being transmitted to a logical circuit means for enabling the reading of the instantaneous value of a position voltage signal proportional to and representative of the tangent of the scan angle of each said scanning light beam;

wherein a secondary laser scanning means is provided and located adjacent the said planar surface along the scan plane of said scanning light beam, the distance being such that interference between the scanning light plane of each primary scanning laser and that of the secondary laser scanning means is prevented and wherein the beam from said secondary laser scanning means impinges on a retro-reflecting bevel positioned around the perimeter of said planar surface for providing a contact signal indicating contact between said planar surface and said marking stylus and wherein said contact signal is detected by a secondary detecting means, the said secondary laser scanning means comprising at least one scanning laser beam.

16. A graphic input system for digitizing the location of an object moving on a planar surface, comprising:

at least two primary scanning lasers each delivering scanning light beams from above said planar surface, a scanning mirror interposed along the path of each of said scanning light beams and each scanning mirror being controllably pivotally mounted so as to deflect the path of each of said scanning light beams, the arrangement being such that the scanning light beams from each of said primary scanning lasers is controllably driven across said planar surface through electromagnetic excitation of each scan mirror, a marking stylus arranged to be moved over said planar surface, a detecting means for detecting the impingement of each of said scanning light beams from each primary scanning laser on said marking stylus, said detecting means for generating a trigger voltage signal, the trigger voltage signal being transmitted to a logical circuit means for enabling the reading of the instantaneous value of a position voltage signal proportional to and representative of the tangent of the scan angle of each said scanning light beam;

wherein a secondary laser scanning means is provided and located adjacent the said planar surface along the scan plane of said scanning light, the distance being such that interference between the scanning light plane of each primary scanning laser and that of the secondary laser scanning means is prevented and wherein the beam from said secondary laser scanning means impinges on a retro-reflecting bevel positioned around the perimeter of said planar surface for providing a contact signal indicating contact between said planar surface and said marking stylus and wherein said contact signal is detected by a secondary detecting means, the said secondary laser scanning means comprising at least one scanning laser beam; and wherein said secondary laser scanning means includes a light reflecting bevel comprising a secondary detecting means for the detection of a signal created by said secondary detecting means and which indicates contact between said planar surface and said marking stylus.

17. The graphic input system as defined in claim 2 wherein the scan beams created by the angular oscillation of said scanning mirror impinges alternately on opposite sides of said marking stylus to determine the center of said marking stylus.

18. The graphic input system as defined in claim 2 wherein the scan beams created by the angular oscillation of said scanning mirror impinges alternately upon opposite sides of said marking stylus for detection by said detecting means, and wherein the said scan beams created by said oscillatory scan means impinge alternately on opposite sides of the reflective stylus for determining the central axis of said writing stylus.

* * * * *

UNITED STATES PATENT AND TRADEMARK OFFICE
CERTIFICATE OF CORRECTION

PATENT NO. : 5,525,764
DATED : June 11, 1996
INVENTOR(S) : John L. Junkins et al.

It is certified that error appears in the above-indentified patent and that said Letters Patent is hereby corrected as shown below:

Add the drawing sheets, consisting of FIGS. 14, 21, 22, 23, 24 and 25, as shown on the attached pages.

Signed and Sealed this

Twelfth Day of November, 1996

Attest:

BRUCE LEHMAN

Attesting Officer   Commissioner of Patents and Trademarks